United States Patent
Wu

(10) Patent No.: US 9,874,732 B2
(45) Date of Patent: Jan. 23, 2018

(54) ZOOM LENS AND IMAGE DEVICE USING THE SAME

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Wei-Cheng Wu, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/071,383

(22) Filed: Mar. 16, 2016

(65) Prior Publication Data

US 2017/0184827 A1  Jun. 29, 2017

(30) Foreign Application Priority Data

Dec. 28, 2015  (TW) .............................. 104144024 A

(51) Int. Cl.
  *G02B 15/14* (2006.01)
  *G02B 15/177* (2006.01)
  *G02B 13/00* (2006.01)

(52) U.S. Cl.
  CPC ......... *G02B 15/177* (2013.01); *G02B 13/006* (2013.01); *G02B 13/009* (2013.01); *G02B 13/0045* (2013.01)

(58) Field of Classification Search
  CPC .... G02B 15/177; G02B 15/163; G02B 15/14; G02B 15/173; G02B 15/167
  USPC .................................................. 359/676, 689
  See application file for complete search history.

(56) References Cited

U.S. PATENT DOCUMENTS

| | | | | |
|---|---|---|---|---|
| 4,312,572 A | * | 1/1982 | Yamashita et al. .... | G02B 13/24 359/676 |
| 5,455,713 A | * | 10/1995 | Kreitzer | ......................... 359/649 |
| 6,853,498 B2 | * | 2/2005 | Kim et al. | .................... 359/689 |
| 7,453,651 B2 | * | 11/2008 | Narikawa et al. | ............ 359/689 |
| 2010/0027134 A1 | * | 2/2010 | Kawakami | ..................... 359/689 |
| 2011/0242685 A1 | * | 10/2011 | Yamamoto | .................... 359/786 |
| 2012/0162768 A1 | * | 6/2012 | Kuzuhara et al. | ............. 359/557 |

FOREIGN PATENT DOCUMENTS

| | | |
|---|---|---|
| CN | 101344636 A | 1/2009 |
| JP | 2011-85960 A | 4/2011 |

* cited by examiner

*Primary Examiner* — James Greece
(74) *Attorney, Agent, or Firm* — Steven Reiss

(57) ABSTRACT

A zoom lens includes a first lens group having a negative refractive power, a second lens group having a positive refractive power, a third lens group having a negative refractive power, and an image plane in an order from object-side to image-side. The first lens group includes a first lens having a positive refractive power and a second lens having a negative refractive power in the order from object-side to image-side. The second lens group includes a third lens having a positive refractive power, a fourth lens having a negative refractive power, and a fifth lens having a positive refractive power in the order from object-side to image-side. The third lens group includes at least one sixth lens.

16 Claims, 23 Drawing Sheets

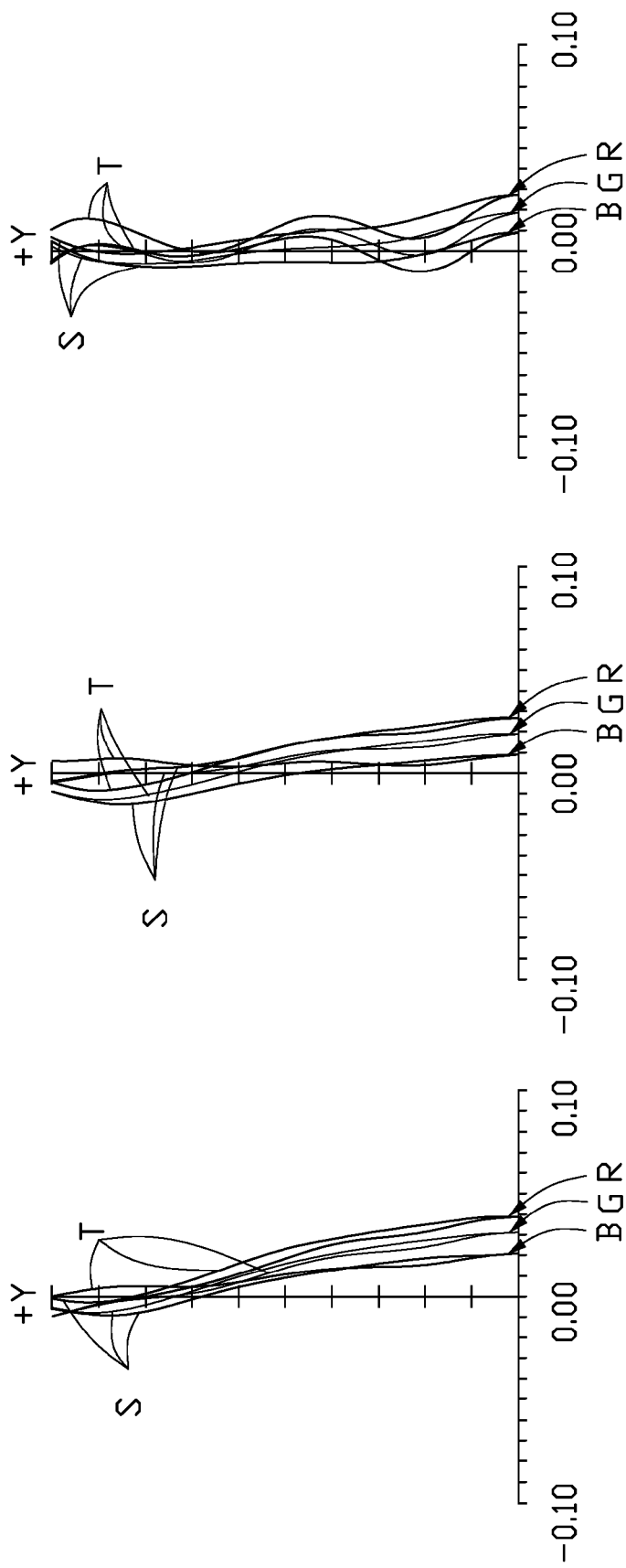

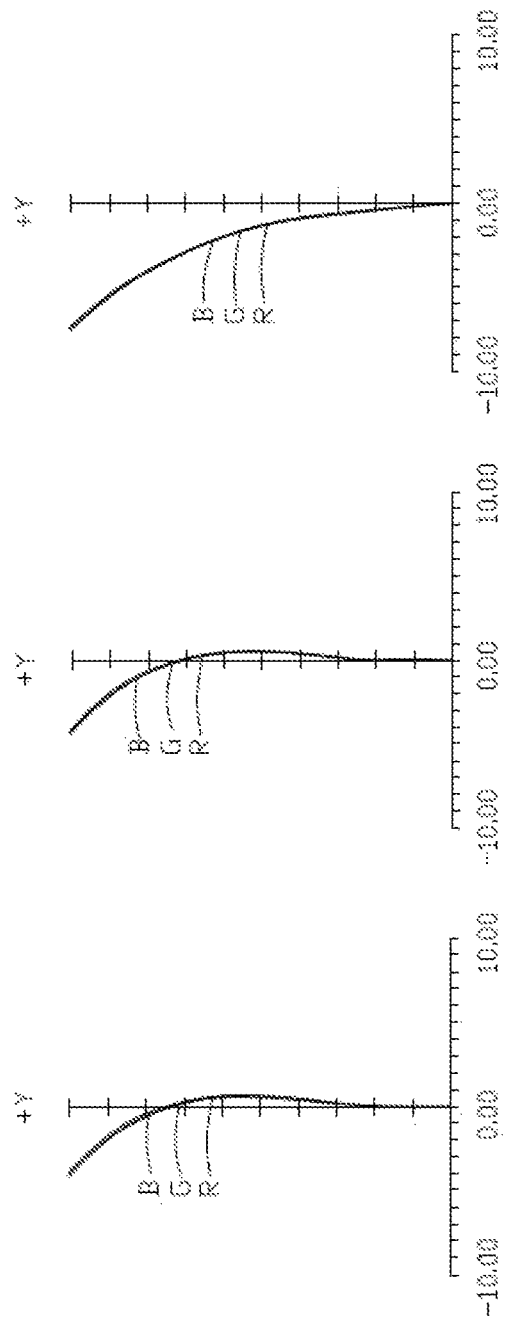

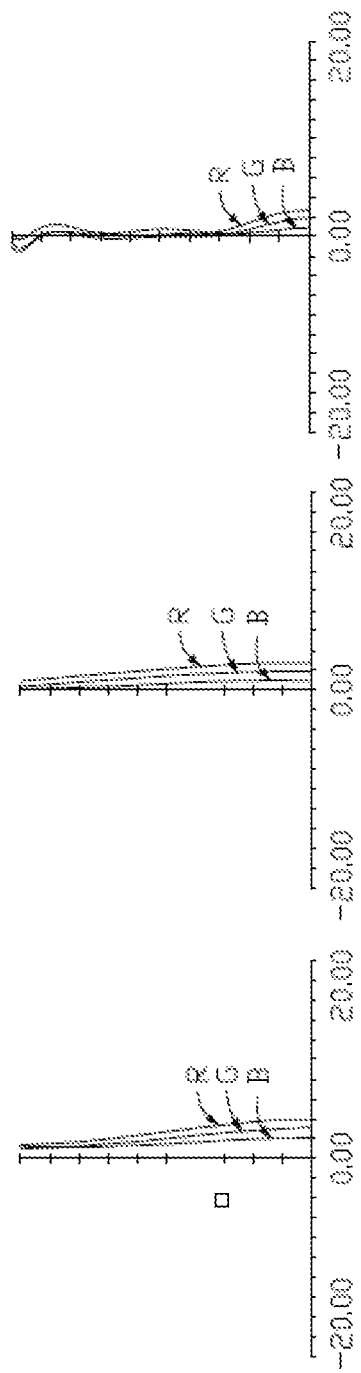

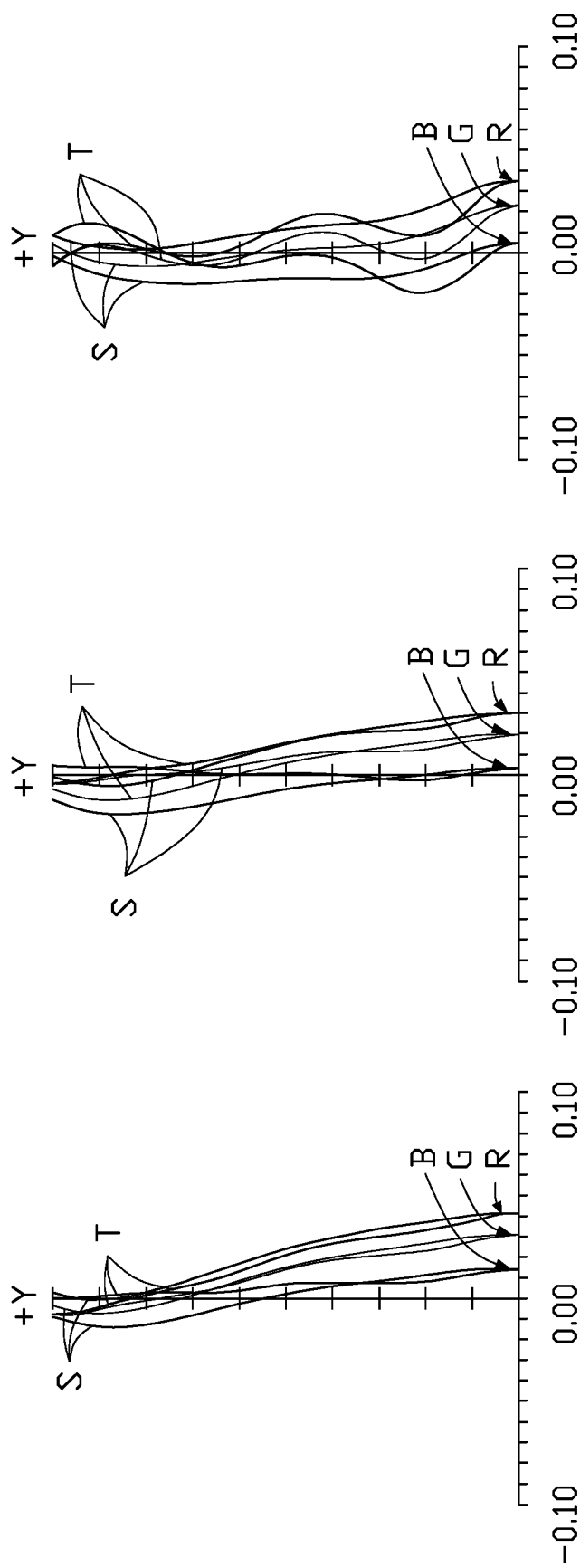

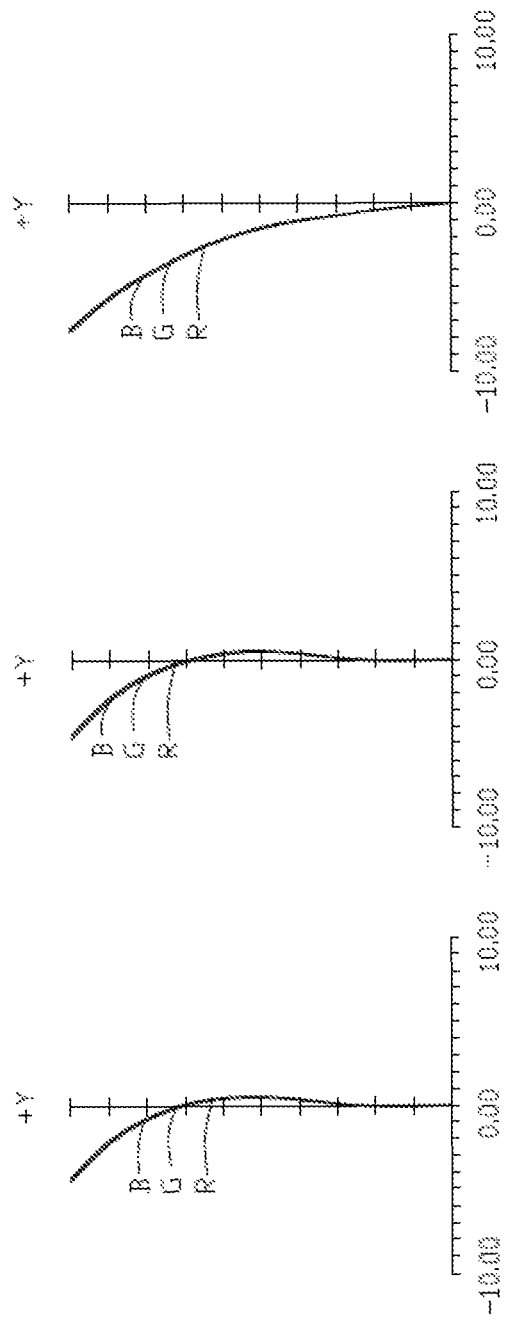

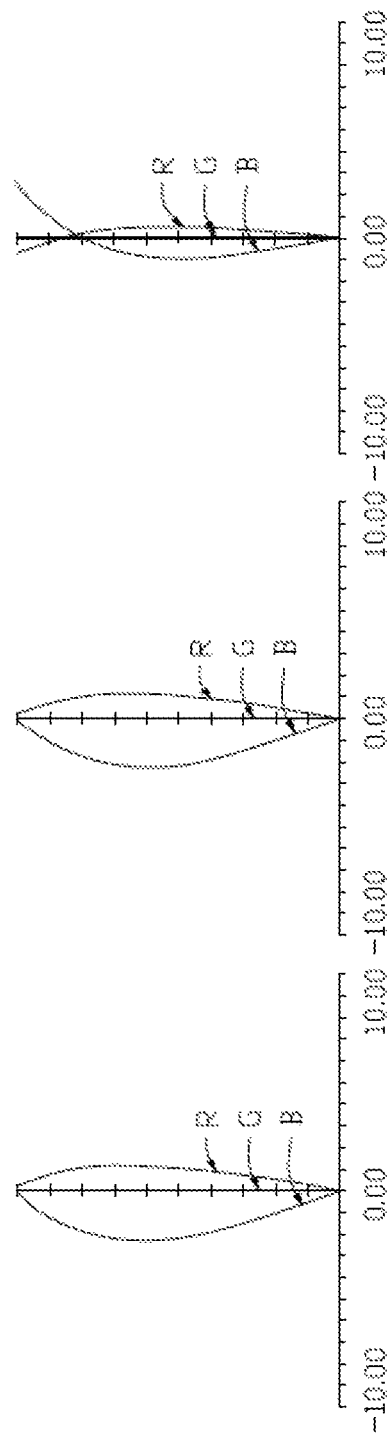

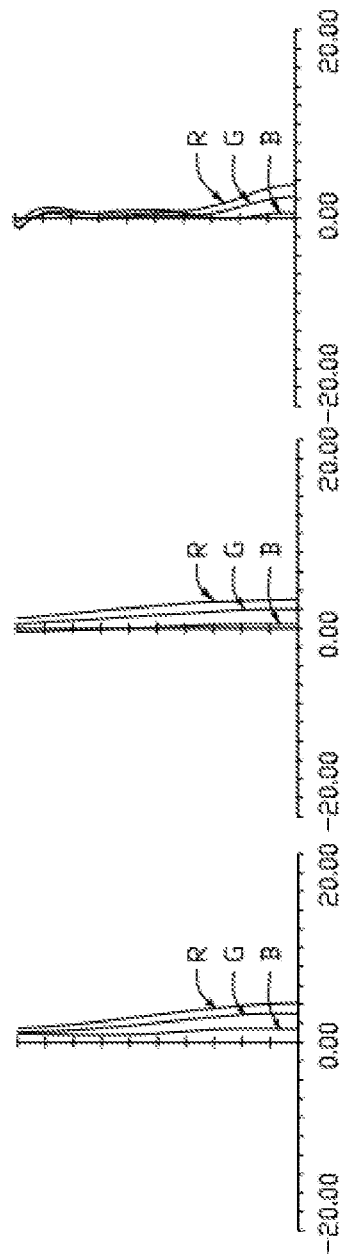

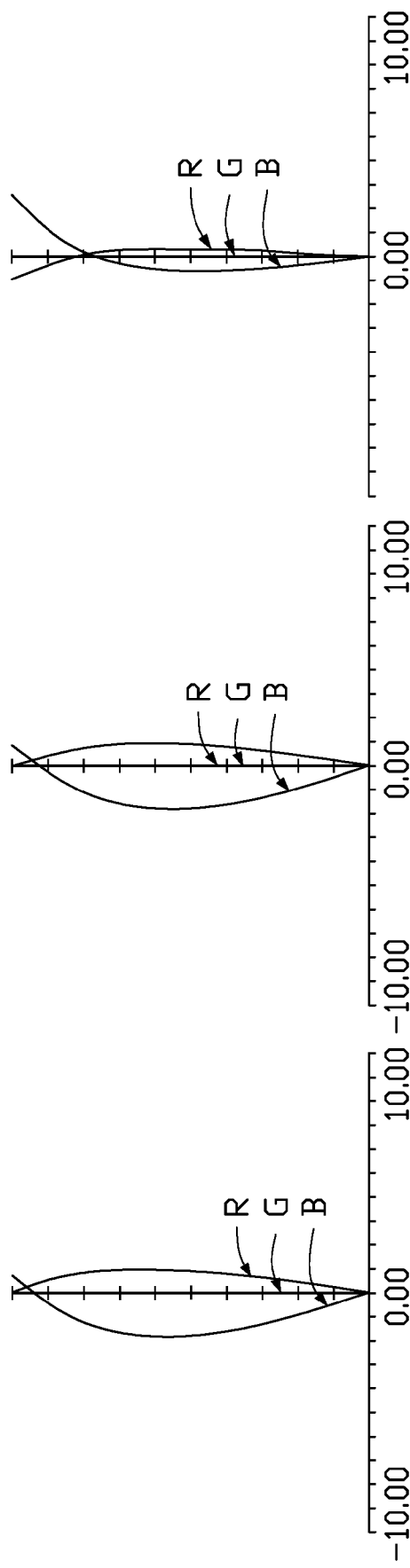

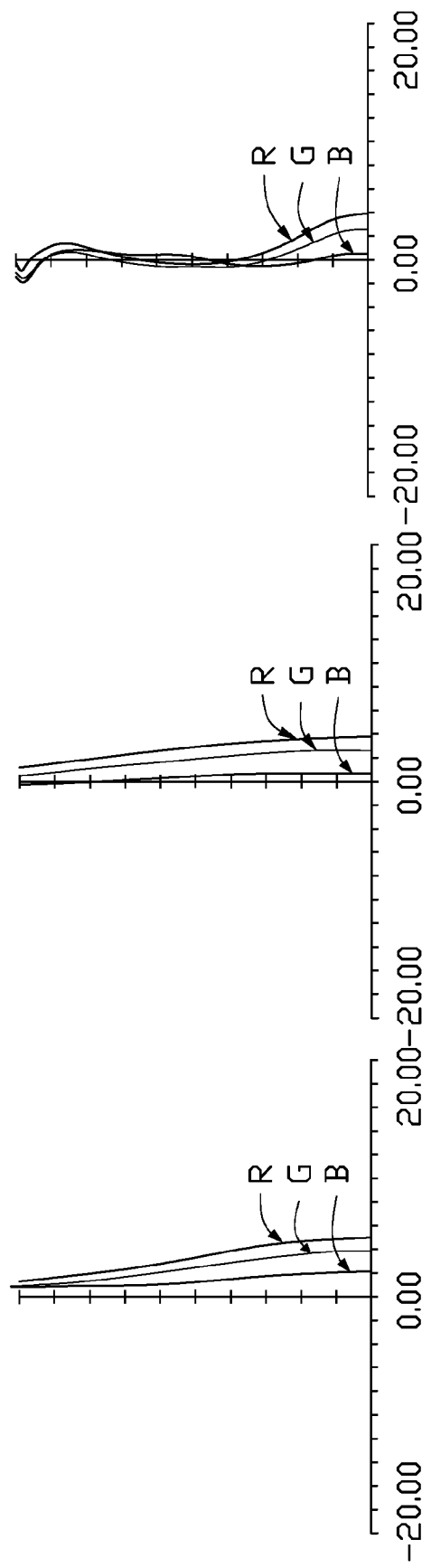

ZOOM LENS AND IMAGE DEVICE USING THE SAME

FIELD

The subject matter herein generally relates to a zoom lens and an image device using the zoom lens.

BACKGROUND

Many electronic devices, such as image devices, include at least one zoom lens. The zoom lens can change focal length to obtain a clear image.

BRIEF DESCRIPTION OF THE DRAWINGS

Implementations of the present technology will now be described, by way of example only, with reference to the attached figures.

FIG. 3A is a field curvature graph of the zoom lens of example 1 at a wide-angle end.

FIG. 3B is a field curvature graph of the zoom lens of example 1 at a middle position.

FIG. 3C is a field curvature graph of the zoom lens of example 1 at a telephoto end.

FIG. 4A is a distortion graph of the zoom lens of example 1 at a wide-angle end.

FIG. 4B is a distortion graph of the zoom lens of example 1 at a middle position.

FIG. 4C is a distortion graph of the zoom lens of example 1 at a telephoto end.

FIG. 6A is a spherical aberration graph of the zoom lens of example 1 at a wide-angle end.

FIG. 6B is a spherical aberration graph of the zoom lens of example 1 at a middle position.

FIG. 6C is a spherical aberration graph of the zoom lens of example 1 at a telephoto end.

FIG. 8A is a field curvature graph of the zoom lens of example 2 at a wide-angle end.

FIG. 8B is a field curvature graph of the zoom lens of example 2 at a middle position.

FIG. 8C is a field curvature graph of the zoom lens of example 2 at a telephoto end.

FIG. 9A is a distortion graph of the zoom lens of example 2 at a wide-angle end.

FIG. 9B is a distortion graph of the zoom lens of example 2 at a middle position.

FIG. 9C is a distortion graph of the zoom lens of example 2 at a telephoto end.

FIG. 10A is a lateral chromatic aberration graph of the zoom lens of example 2 at a wide-angle end.

FIG. 10B is a lateral chromatic aberration graph of the zoom lens of example 2 at a middle position.

FIG. 10C is a lateral chromatic aberration graph of the zoom lens of example 2 at a telephoto end.

FIG. 11A is a spherical aberration graph of the zoom lens of example 2 at a wide-angle end.

FIG. 11B is a spherical aberration graph of the zoom lens of example 2 at a middle position.

FIG. 11C is a spherical aberration graph of the zoom lens of example 2 at a telephoto end.

FIG. 15A is a lateral chromatic aberration graph of the zoom lens of example 3 at a wide-angle end.

FIG. 15B is a lateral chromatic aberration graph of the zoom lens of example 3 at a middle position.

FIG. 15C is a lateral chromatic aberration graph of the zoom lens of example 3 at a telephoto end.

FIG. 16A is a spherical aberration graph of the zoom lens of example 3 at a wide-angle end.

FIG. 16B is a spherical aberration graph of the zoom lens of example 3 at a middle position.

FIG. 16C is a spherical aberration graph of the zoom lens of example 3 at a telephoto end.

DETAILED DESCRIPTION

Figure 1A:
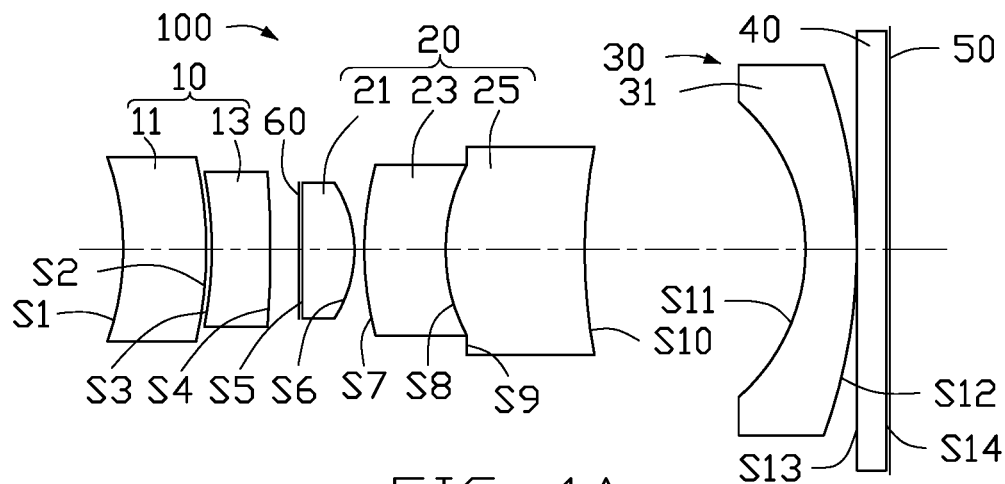
FIG. 1A is a schematic view of an embodiment of a zoom lens at a wide-angle end.

It will be appreciated that for simplicity and clarity of illustration, where appropriate, reference numerals have been repeated among the different figures to indicate opposite or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 1B:
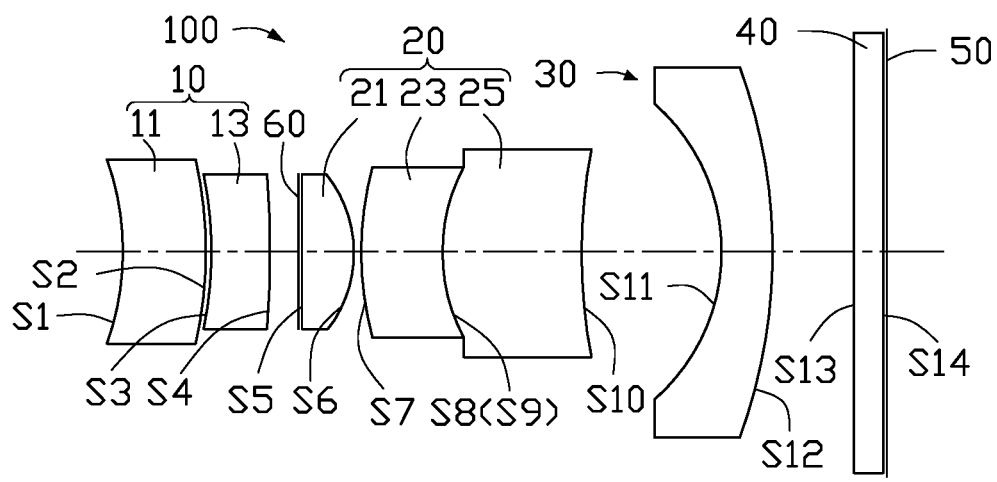
FIG. 1B is a schematic view of an embodiment of a zoom lens at a middle position.
Figure 1C:
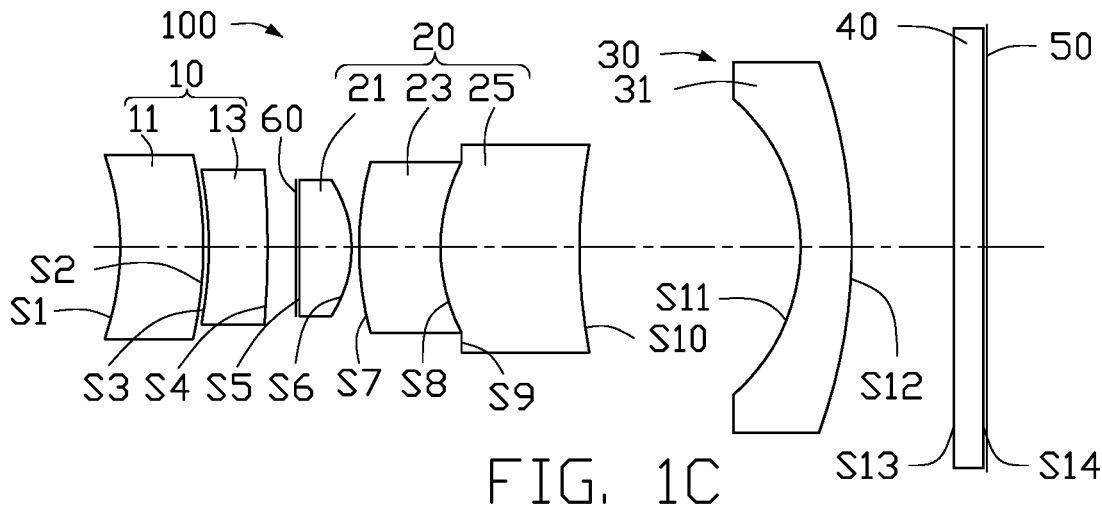
FIG. 1C is a schematic view of an embodiment of a zoom lens at a telephoto end.
Figure 2:
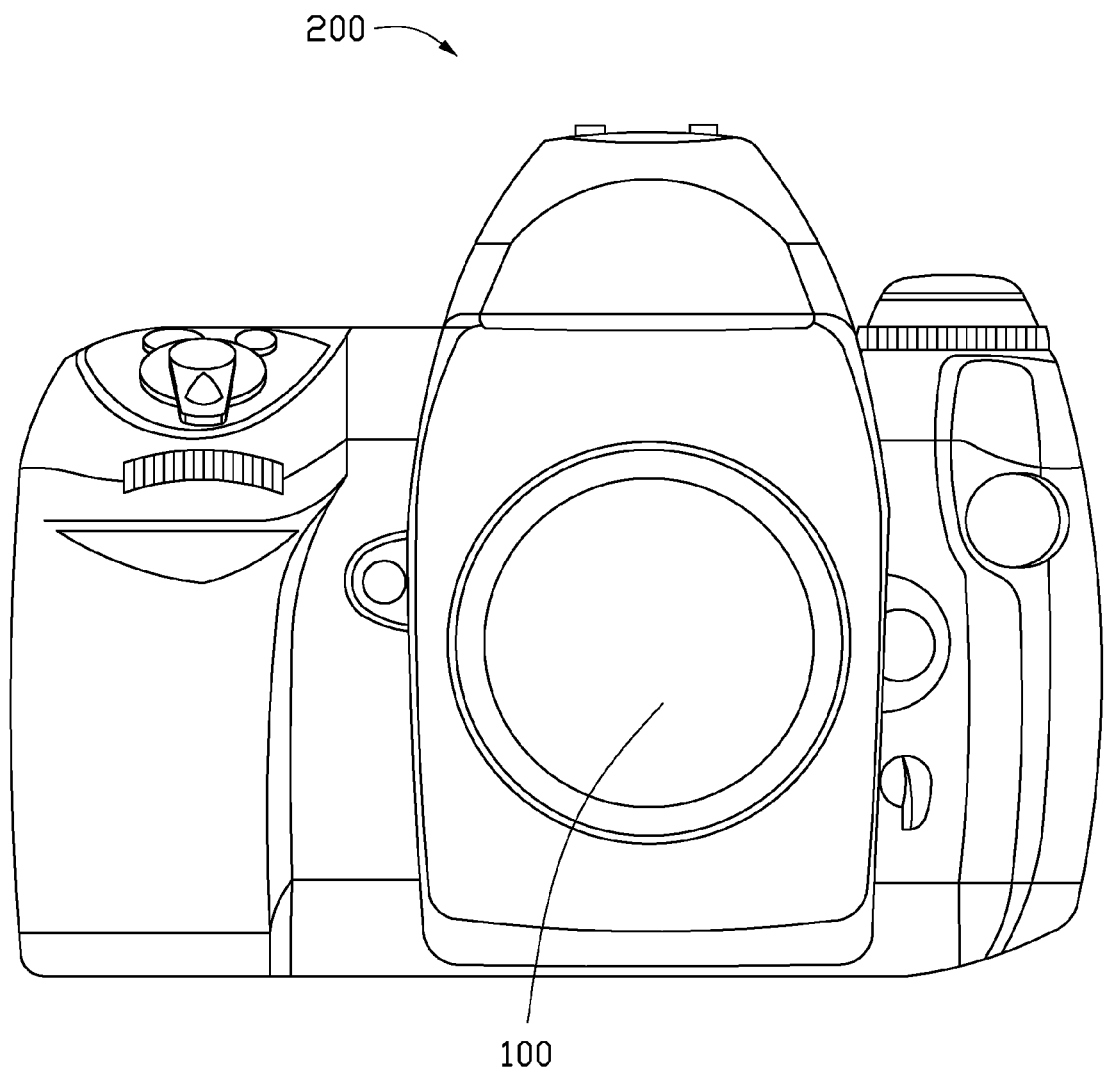
FIG. 2 is an isometric view of an embodiment of an image device having zoom lens.

FIGS. 1A, 1B, and 1C illustrate an embodiment of a zoom lens 100 at a wide-angle end, a middle position, and a telephoto end, respectively. FIG. 2 illustrates an embodiment of an image device 200 having the zoom lens 100. The image device 200 can be a cell phone or a camera. The zoom lens 100 comprises a first lens group 10 having a negative refractive power, a second lens group 20 having a positive refractive power, a third lens group 30 having a negative refractive power, a plane lens 40, and an image plane 50, in an order from object-side to image-side, along an optical axis of the zoom lens 100. The first lens group 10, the second lens group 20, and the third lens group 30 are capable of moving along the optical axis of the zoom lens 100. When zooming from the wide-angle end to the telephoto end, the first lens group 10, the second lens group 20, and the third lens group 30 move towards the object-side along the optical axis.

The first lens group 10 comprises a first lens 11 having a positive refractive power and a second lens 13 having a negative refractive power in the order from object-side to image-side along the optical axis of the zoom lens 100. The first lens 11 is separated from the second lens 13. A filter (not shown) may be positioned between the first lens 11 and the second lens 13 to absorb stray light. At least one of the first lens 11 and the second lens 13 is made of plastic. The first lens 11 comprises a first surface S1 facing the object-side and a second surface S2 facing the image-side. The second lens 13 comprises a third surface S3 facing the object-side and a fourth surface S4 facing the image-side. The first lens 11 and the second lens 13 are meniscus lenses. The first surface S1 and the third surface S3 are concave surfaces, the second surface S2 and the fourth surface S4 are convex surfaces. At least one of the first surface S1, the second surface S2, the third surface S3, and the fourth surface S4 is an aspherical surface.

The second lens group 20 comprises a third lens 21 having a positive refractive power, a fourth lens 23 having a negative refractive power, and a fifth lens 25 having a positive refractive power in the order from object-side to image-side along the optical axis of the zoom lens 100. The third lens 21 and the fourth lens 23 are separated from each other, the fourth lens 23 and the fifth lens 25 are bonded together. At least one of the third lens 21, the fourth lens 23, and the fifth lens 25 is made of plastic. The third lens 21 comprises a fifth surface S5 facing the object-side and a sixth surface S6 facing the image-side. The fourth lens 23 comprises a seventh surface S7 facing the object-side and an eighth surface S8 facing the image-side. The fifth lens 25 comprises a ninth surface S9 facing the object-side and a tenth surface S10 facing the image-side. Both the seventh surface S7 and the ninth surface S9 are convex surfaces, both the eighth surface S8 and the tenth surface S10 are concave surfaces. At least one of the seventh surface S7, the eighth surface S8, the ninth surface S9, and the tenth surface S10 is an aspherical surface.

The third lens group 30 comprises at least one lens having a negative refractive power. At least one lens of the third lens group 30 is made of plastic. In at least one embodiment, the third lens group 30 comprises only one lens, the sixth lens 31, having a negative refractive power. The sixth lens 31 is made of plastic. The sixth lens 31 comprises an eleventh surface S11 facing the object-side and a twelfth surface S12 facing the image-side. The eleventh surface S11 is a concave surface, the twelfth surface S12 is a convex surface. At least one of the eleventh surface S11 and the twelfth surface S12 is an aspherical surface.

The plane lens 40 comprises a thirteenth surface S13 facing the object-side and a fourteenth surface S14 facing the image-side.

The zoom lens 100 further comprises an aperture stop 60 between the first lens group 10 and the second lens group 20. The aperture stop 60 is adjacent to the second lens group 20. The aperture stop 60 is configured to limit luminous flux from the first lens group 10 into the second lens group 20, and make light cone more symmetrical after passing through the first lens group 10. As such, a coma aberration of the zoom lens 100 can be adjusted. The aperture stop 60 is able to move along an optical axis of the zoom lens 100 with the second lens group 20.

In order to maintain excellent optical performance of the zoom lens 100, such as compact configuration, low distortion, and large field of view, the zoom lens 100 satisfies the following formulas, (1), (2) and (3):

$$TLw/Hy \leq 1.6; \tag{1}$$

$$0.03 < |F3/Ft| < 0.15; \tag{2}$$

$$8.9 < |(Fw \times F1)/(Ft \times F3)| < 12.6. \tag{3}$$

Wherein TLw denotes a distance from the first surface S1 to the image plane 50 of the zoom lens 100 at the wide-angle end along the optical axis of the zoom lens 100 and Hy denotes an image height of the zoom lens 100 at the telephoto end. F1 denotes an effective focal length of the first lens group 10, F3 denotes an effective focal length of the third lens group 30, Fw denotes an effective focal length of the zoom lens 100 at the wide-angle end, and Ft denotes an effective focal length of the zoom lens 100 at the telephoto end.

In at least one embodiment, in order to obtain a quick focusing function, the zoom lens 100 further satisfies the following formulas, (4) and (5):

$$1.06 < |R12/R11| < 1.15; \tag{4}$$

$$0.12 < |(TLw-TLt)/Fw| < 0.13. \tag{5}$$

Wherein R11 denotes a radius of curvature of the first surface S1 and R12 denotes a radius of curvature of the second surface S2. TLt denotes a distance from the first surface S1 to the image plane 50 of the zoom lens 100 at the telephoto end along the optical axis of the zoom lens 100.

In at least one embodiment, in order to correct curvature of field and aberration, and compensate for lateral chromatic aberration, the zoom lens 100 further satisfies the following formulas, (6) and (7):

$$n1 < 30 \text{ and } |n1-n2| < 0.13; \tag{6}$$

$$0.28 < |f4/V4 + f5/V5| < 0.42. \tag{7}$$

Wherein n1 denotes a refractive index of the first lens 11 and n2 denotes a refractive index of the second lens 13. f4 denotes an effective focal length of the fourth lens 23, f5 denotes an effective focal length of the fifth lens 25, V4 denotes an Abbe number of the fourth lens 23, and V5 denotes an Abbe number of the fifth lens 25.

The aspherical surface can satisfy the following formula:

$$z = \frac{ch^2}{1+\sqrt{1-(k+1)c^2h^2}} + E_4 h^4 + E_6 h^6 + E_8 h^8 + E_{10} h^{10}$$

Wherein z denotes a distance of the aspherical surface along the optical axis of the zoom lens 100 and c denotes a reciprocal of radius of curvature of a datum surface. h denotes a vertical distance from the aspherical surface to the optical axis and k denotes a conic constant. $E_4$, $E_6$, $E_8$ and $E_{10}$ are a fourth aspherical coefficient, a sixth aspherical coefficient, an eighth aspherical coefficient, and a tenth aspherical coefficient, respectively.

In the following examples, i denotes an positive integer, Di denotes a distance along the optical axis between the surface S1 and the surface S1+1, and Fm denotes a focal length of the zoom lens 100 at the middle position. Referring to FIG. 3A to FIG. 17C, B denotes blue light having a wavelength of 486.1 nm, G denotes green light having a wavelength of 546.1 nm, and R denotes red light having a wavelength of 656.3 nm. T denotes a tangential field curvature curve and S denotes a sagittal field curvature curve.

Example 1

Tables 1-3 list the parameters of the zoom lens 100 of the example 1.

TABLE 1

Focal length of the zoom lens 100 (F) = 3.03~15.19 mm; F-number (Fno.) = 2.0~3.9

| Surface | Radius of curvature (mm) | Di(mm) | Refractive index | Abbe number |
|---|---|---|---|---|
| S1 | −4.5866 | 1.0689 | 1.846663 | 23.83 |
| S2 | −5.0493 | 0.0412 | 1.000000 | — |
| S3 | −16.9673 | 0.7560 | 1.635050 | 23.90 |
| S4 | −49.8575 | D4 | 1.000000 | — |
| 60 | Infinity | 0.0160 | 1.000000 | — |
| S5 | 49.7728 | 0.6472 | 1.491756 | 57.44 |
| S6 | −3.7231 | 0.0176 | 1.000000 | — |
| S7 | 4.5879 | 1.0545 | 1.635050 | 23.90 |
| S9 | 2.4778 | 1.8042 | 1.544100 | 23.90 |
| S10 | 11.3416 | D10 | 1.000000 | — |
| S11 | −3.6813 | 0.4351 | 1.491756 | 57.44 |
| S12 | 0.4217 | D12 | 1.000000 | — |
| S13 | Infinity | 0.3000 | 1.516330 | 64.14 |
| S14 | Infinity | 0.0500 | 1.000000 | — |

TABLE 2

| Surface | k | $E_4$ | $E_6$ | $E_8$ | $E_{10}$ |
|---|---|---|---|---|---|
| S3 | 0 | −2.073E−02 | −1.557E−03 | 7.299E−04 | −6.310E−05 |
| S4 | −9.949E+39 | −1.237E−02 | −5.217E−04 | 6.206E−04 | −6.615E−05 |
| S5 | −9.958E+39 | 1.307E−02 | −2.180E−03 | 2.062E−04 | −2.647E−06 |
| S6 | 0 | 8.397E−04 | 5.799E−04 | −1.564E−04 | 2.343E−05 |
| S7 | 0 | −4.156E−03 | −3.281E−04 | 3.177E−04 | −2.897E−05 |
| S8 | 0 | 7.676E−03 | 1.404E−02 | 3.047E−02 | −1.302E−04 |
| S10 | 0 | −1.105E−03 | 1.022E−03 | −8.505E−05 | 2.280E−05 |
| S11 | −2.199E+01 | −7.819E−02 | 1.699E−02 | −2.321E−03 | 1.394E−04 |
| S12 | −1.127E+39 | −2.930E−02 | 5.359E−03 | −4.821E−04 | 1.563E−05 |

TABLE 3

| The state of the zoom lens 100 | D4 | D10 | D12 |
|---|---|---|---|
| At the wide-angle end (Fw = 3.03 mm) | 0.4099 | 0.4226 | 0.0200 |
| At the middle position (Fm = 3.09 mm) | 2.9891 | 2.9645 | 2.1133 |
| At the telephoto end (Ft = 15.19 mm) | 0.0200 | 0.0599 | 1.1931 |

Figures 5A, 5B, 5C:
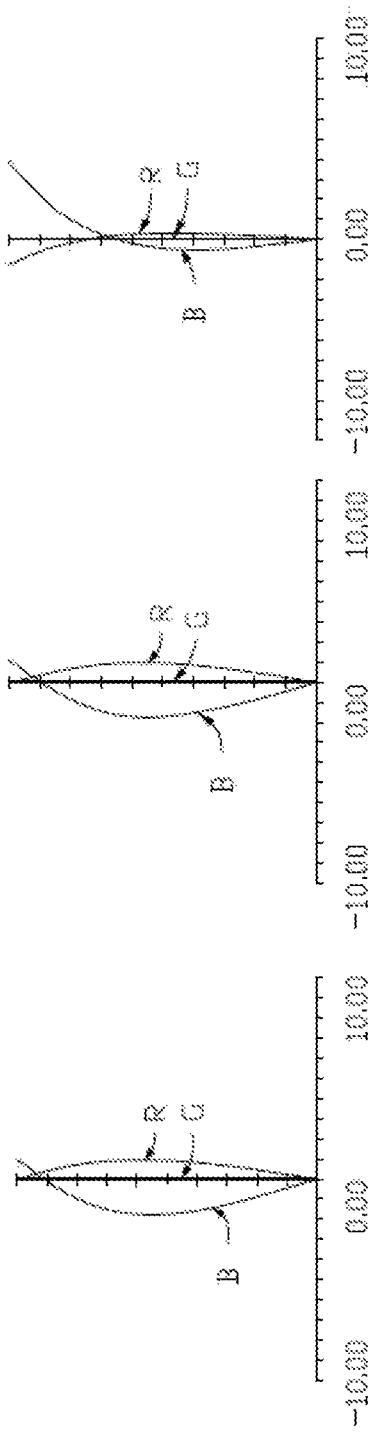
FIG. 5A is a lateral chromatic aberration graph of the zoom lens of example 1 at a wide-angle end.
FIG. 5B is a lateral chromatic aberration graph of the zoom lens of example 1 at a middle position.
FIG. 5C is a lateral chromatic aberration graph of the zoom lens of example 1 at a telephoto end.
Figure 7A:
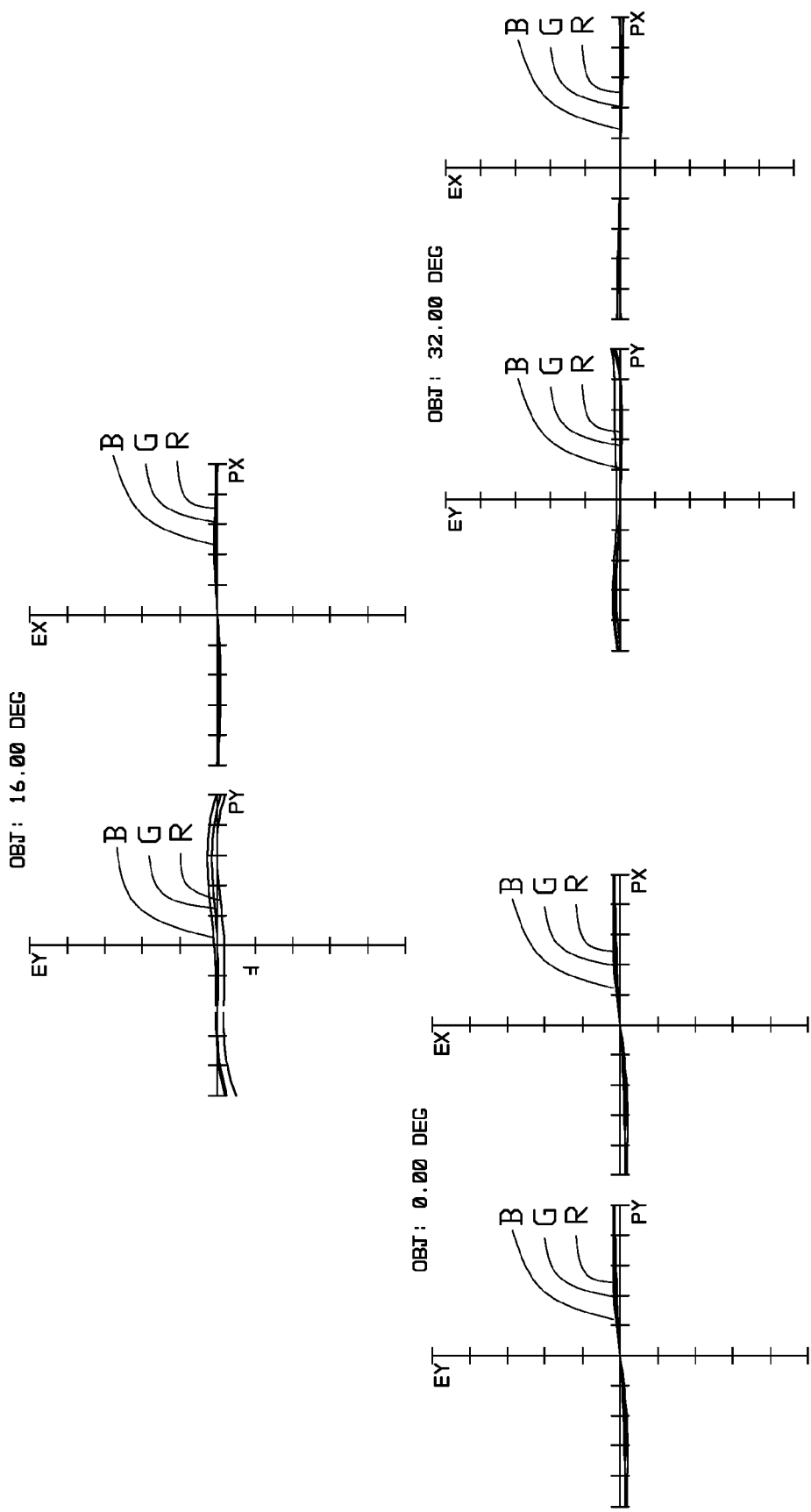
FIG. 7A are coma aberration graphs of the zoom lens of example 1 at a wide-angle end.

FIG. 3A is a field curvature graph of blue light, green light, and red light when the zoom lens 100 is at the wide-angle end. FIG. 4A is a distortion graph of the same three colors of light when the zoom lens 100 is at the wide-angle end. FIG. 5A is a lateral chromatic aberration graph of the same three colors of light when the zoom lens 100 is at the wide-angle end. FIG. 6A is a spherical aberration graph of the same three colors of light when the zoom lens 100 is at the wide-angle end. FIG. 7A is a coma aberration graph of the same three colors of light when the zoom lens 100 is at the wide-angle end. Both tangential field curvature and sagittal field curvature of the zoom lens 100 shown in the FIG. 3A are kept within a range of −0.01 mm to 0.039 mm. The distortion of the zoom lens 100 is less than 4.2%. The lateral chromatic aberration of the zoom lens 100 is less than 2.7 μm. The spherical aberration of the zoom lens 100 is kept within a range of 0.009 mm to 0.039 mm. All coma aberrations of the zoom lens 100 at various angles are acceptable.

Figure 7B:
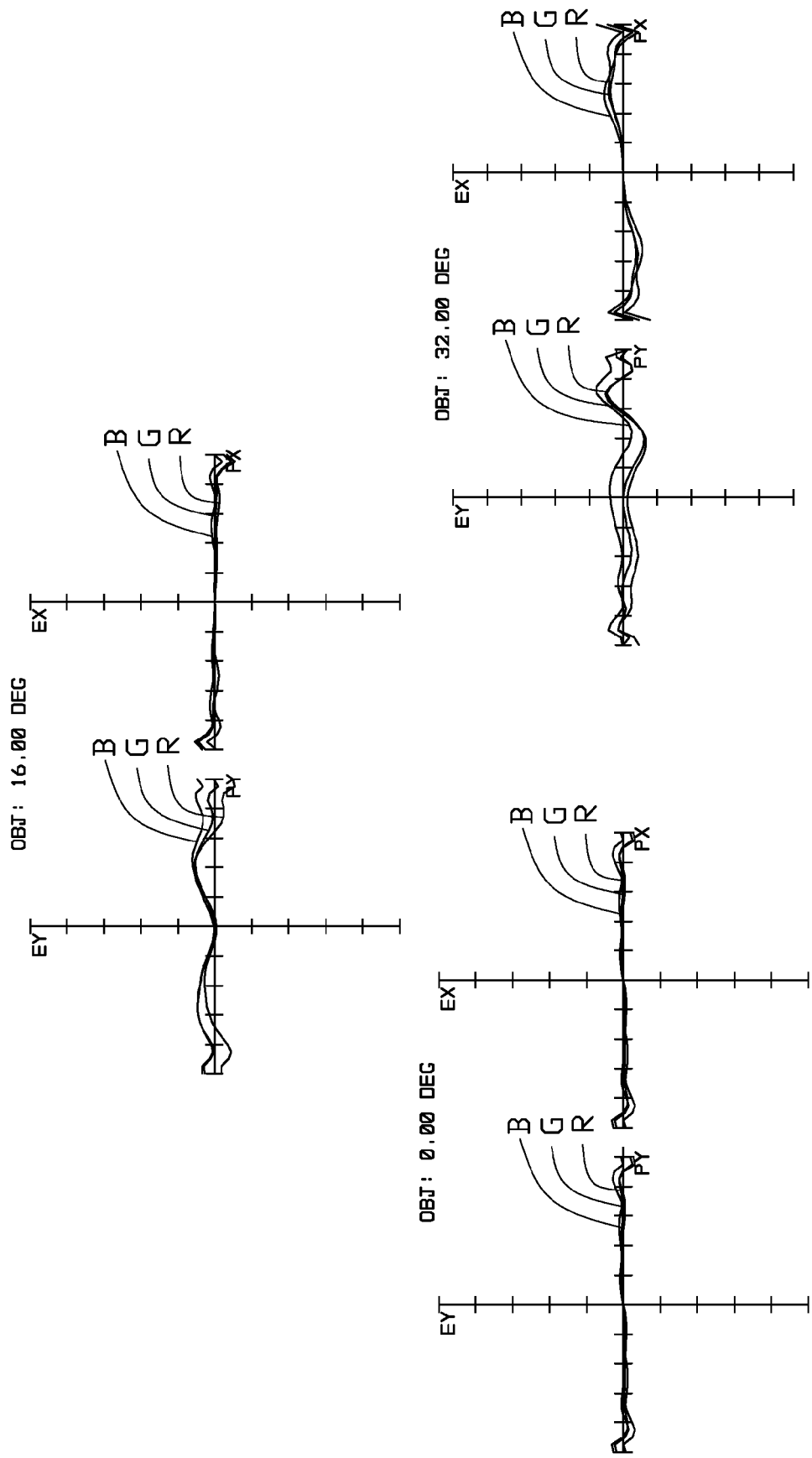
FIG. 7B are coma aberration graphs of the zoom lens of example 1 at a middle position.

FIG. 3B is a field curvature graph of the same three colors of light when the zoom lens 100 is at the middle position. FIG. 4B is a distortion graph of the same three colors of light when the zoom lens 100 is at the middle position. FIG. 5B is a lateral chromatic aberration graph of the same three colors of light when the zoom lens 100 is at the middle position. FIG. 6B is a spherical aberration graph of the same three colors of light when the zoom lens 100 is at the middle position. FIG. 7B is a coma aberration graph of the same three colors of light when the zoom lens 100 is at the middle position. Both tangential field curvature and sagittal field curvature of the zoom lens 100 shown in the FIG. 3B are kept within a range of −0.015 mm to 0.027 mm. The distortion of the zoom lens 100 is less than 4.4%. The lateral chromatic aberration of the zoom lens 100 is less than 2.7 μm. The spherical aberration of the zoom lens 100 is kept within a range of 0.000 mm to 0.027 mm. All coma aberrations of the zoom lens 100 at various angles are acceptable.

Figure 7C:
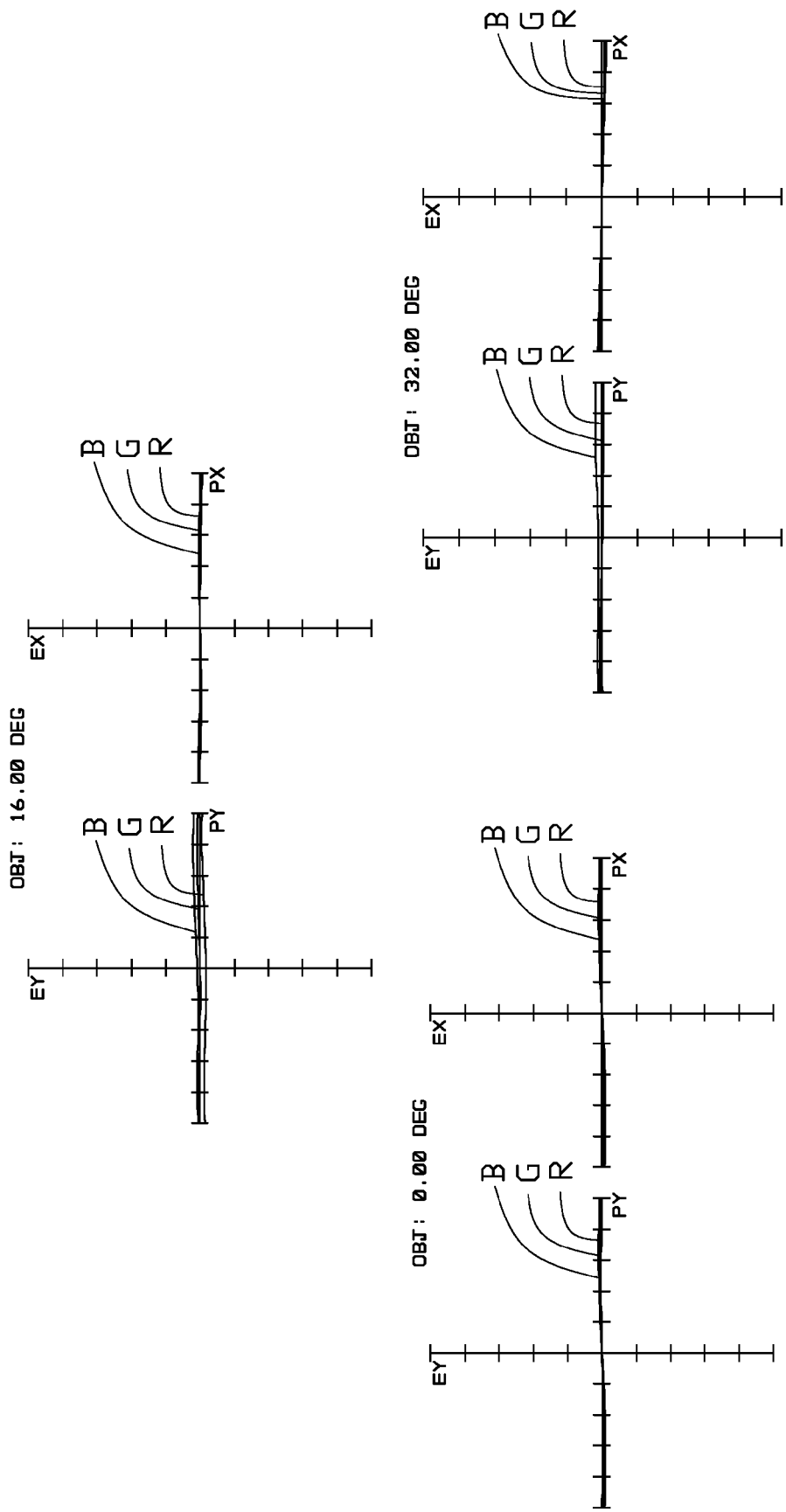
FIG. 7C are coma aberration graphs of the zoom lens of example 1 at a telephoto end.

FIG. 3C is a field curvature graph of the same three colors of light when the zoom lens 100 is at the telephoto end. FIG. 4C is a distortion graph of the same three colors of light when the zoom lens 100 is at the telephoto end. FIG. 5C is a lateral chromatic aberration graph of the same three colors of light when the zoom lens 100 is at the telephoto end. FIG. 6C is a spherical aberration graph of the same three colors of light when the zoom lens 100 is at the telephoto end. FIG. 7C is a coma aberration graph of the same three colors of light when the zoom lens 100 is at the telephoto end. Both tangential field curvature and sagittal field curvature of the zoom lens 100 shown in the FIG. 3C are kept within a range of −0.01 mm to 0.027 mm. The distortion of the zoom lens 100 is less than −7.6%. The lateral chromatic aberration of the zoom lens 100 is less than 5.2 μm. The spherical aberration of the zoom lens 100 is kept within a range of −0.01 mm to 0.027 mm. All coma aberrations of the zoom lens 100 at various angles are acceptable.

As a result, the optical performance (such as field curvature, distortion, lateral chromatic aberration, spherical aberration, and coma aberration) of the zoom lens 100 of the example 1 can be controlled/corrected to an acceptable level when the zoom lens 100 is at the wide-angle end, the middle position or the telephoto end.

Example 2

Tables 4-6 list the parameters of the zoom lens 100 of the example 2. A structure of the zoom lens 100 of the example 2 is the same as a structure of the zoom lens 100 of the example 1.

TABLE 4

Focal length of the zoom lens 100 (F) = 3.03~15.18 mm; F-number (Fno.) = 2.0~3.9

| Surface | Radius of curvature (mm) | Di(mm) | Refractive index | Abbe number |
|---|---|---|---|---|
| S1 | −4.7855 | 1.0536 | 1.846663 | 23.83 |
| S2 | −5.1956 | 0.0400 | 1.000000 | — |
| S3 | −15.8370 | 0.7582 | 1.635050 | 23.90 |
| S4 | −38.1775 | D4 | 1.000000 | — |
| 60 | Infinity | 0.0158 | 1.000000 | — |
| S5 | 79.9935 | 0.6558 | 1.491756 | 57.44 |
| S6 | −3.6437 | 0.0165 | 1.000000 | — |
| S7 | 4.7458 | 1.0587 | 1.635050 | 23.90 |
| S9 | 2.6915 | 1.7966 | 1.544100 | 23.90 |
| S10 | 10.9175 | D10 | 1.000000 | — |
| S11 | −3.6791 | 0.3626 | 1.491756 | 57.44 |
| S12 | 0.4185 | D12 | 1.000000 | — |
| S13 | Infinity | 0.3000 | 1.516330 | 64.14 |
| S14 | Infinity | 0.0500 | 1.000000 | — |

TABLE 5

| Surface | k | $E_4$ | $E_6$ | $E_8$ | $E_{10}$ |
|---|---|---|---|---|---|
| S3 | 0 | −2.100E−02 | −1.644E−03 | 7.263E−04 | −6.291E−05 |
| S4 | −9.949E+39 | −1.233E−02 | −5.826E−04 | 6.183E−04 | −6.618E−05 |
| S5 | −9.957E+39 | 1.291E−02 | −2.217E−03 | 2.164E−04 | −3.269E−06 |
| S6 | 0 | 4.515E−04 | 6.884E−04 | −1.627E−04 | 2.391E−05 |
| S7 | 0 | −3.733E−03 | −4.373E−04 | 3.310E−04 | −3.010E−05 |
| S8 | 0 | 1.723E−02 | −1.541E−02 | 3.324E−03 | −1.436E−04 |
| S10 | 0 | −1.897E−03 | 1.111E−03 | −1.129E−04 | 2.651E−05 |
| S11 | −2.426E+01 | −8.259E−02 | 1.838E−02 | −2.404E−03 | 1.377E−04 |
| S12 | −1.127E+39 | −3.253E−02 | 6.308E−03 | −5.845E−04 | 1.989E−05 |

TABLE 6

| The state of the zoom lens 100 | D4 | D10 | D12 |
|---|---|---|---|
| At the wide-angle end (Fw = 3.03 mm) | 0.4366 | 3.0723 | 0.0200 |
| At the middle position (Fm = 3.09 mm) | 0.4481 | 3.0480 | 0.0584 |

TABLE 6-continued

| The state of the zoom lens 100 | D4 | D10 | D12 |
|---|---|---|---|
| At the telephoto end (Ft = 15.18 mm) | 0.5267 | 2.1890 | 1.1849 |

Figure 12A:
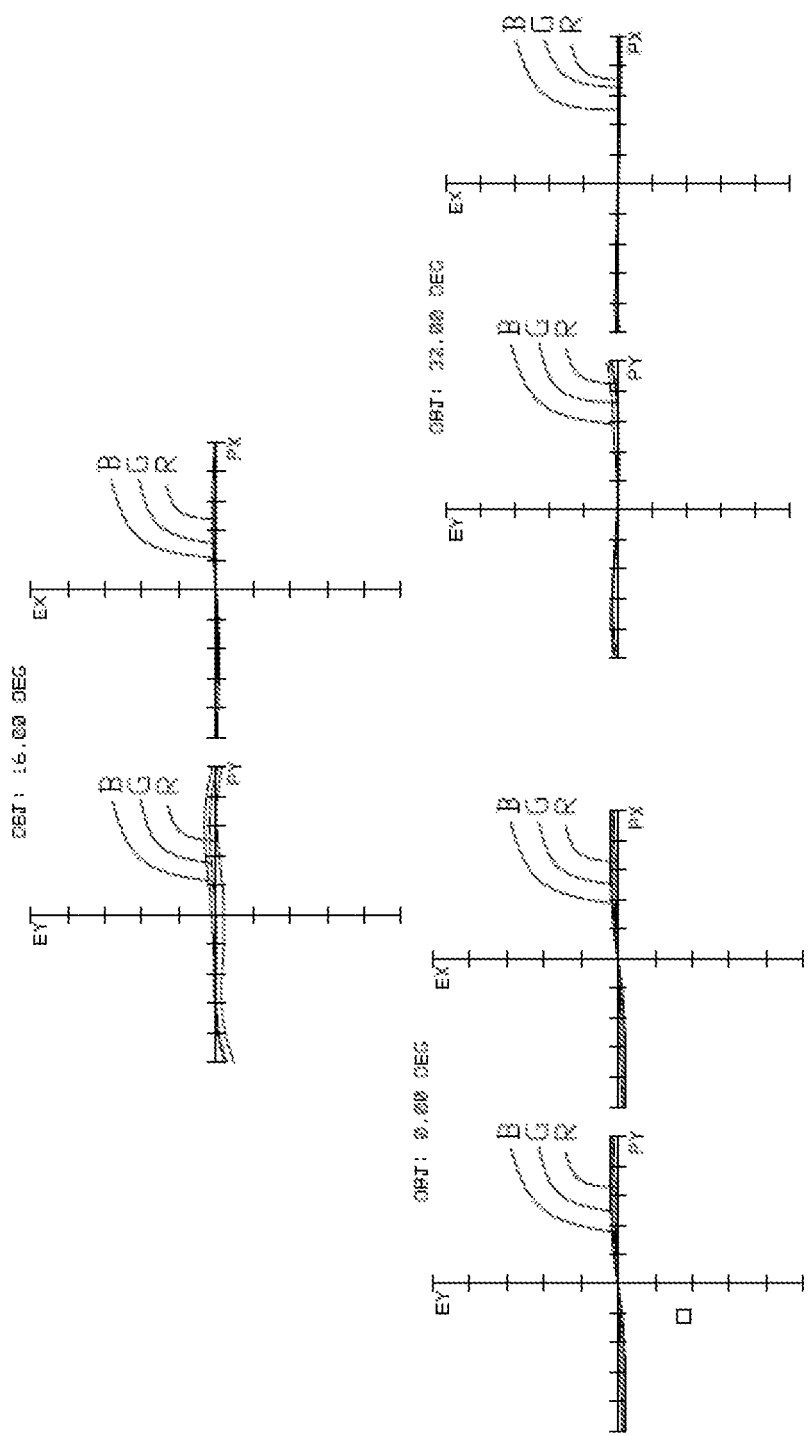
FIG. 12A are coma aberration graphs of the zoom lens of example 2 at a wide-angle end.

FIG. 8A is a field curvature graph of blue, green, and red light when the zoom lens 100 is at the wide-angle end. FIG. 9A is a distortion graph of the same three colors of light when the zoom lens 100 is at the wide-angle end. FIG. 10A is a lateral chromatic aberration graph of the same three colors of light when the zoom lens 100 is at the wide-angle end. FIG. 11A is a spherical aberration graph of the same three colors of light when the zoom lens 100 is at the wide-angle end. FIG. 12A is a coma aberration graph of the same three colors of light when the zoom lens 100 is at the wide-angle end. Both tangential field curvature and sagittal field curvature of the zoom lens 100 shown in the FIG. 8A are kept within a range of −0.014 mm to 0.041 mm. The distortion of the zoom lens 100 is less than −4.6%. The lateral chromatic aberration of the zoom lens 100 is less than 3.5 μm. The spherical aberration of the zoom lens 100 is kept within a range of 0.008 mm to 0.041 mm. All coma aberrations of the zoom lens 100 at various angles are acceptable.

Figure 12B:
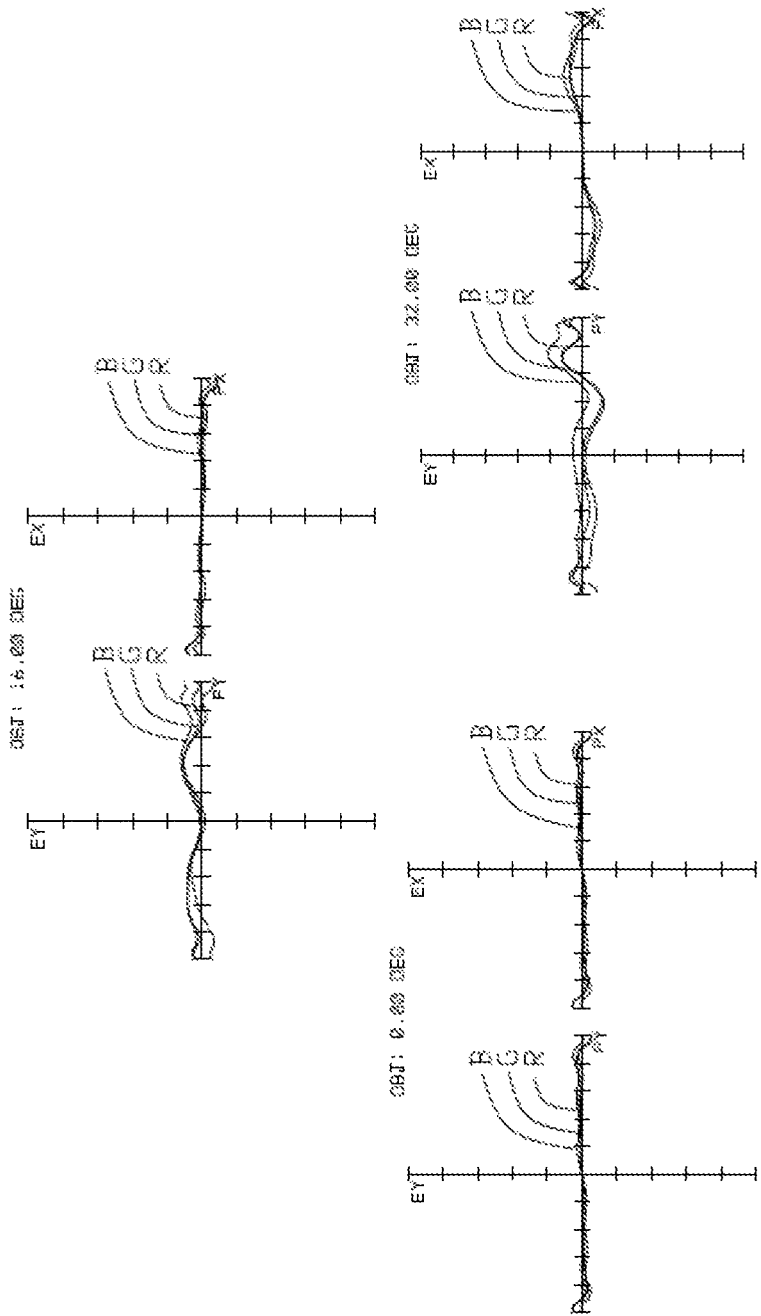
FIG. 12B are coma aberration graphs of the zoom lens of example 2 at a middle position.
Figure 12C:
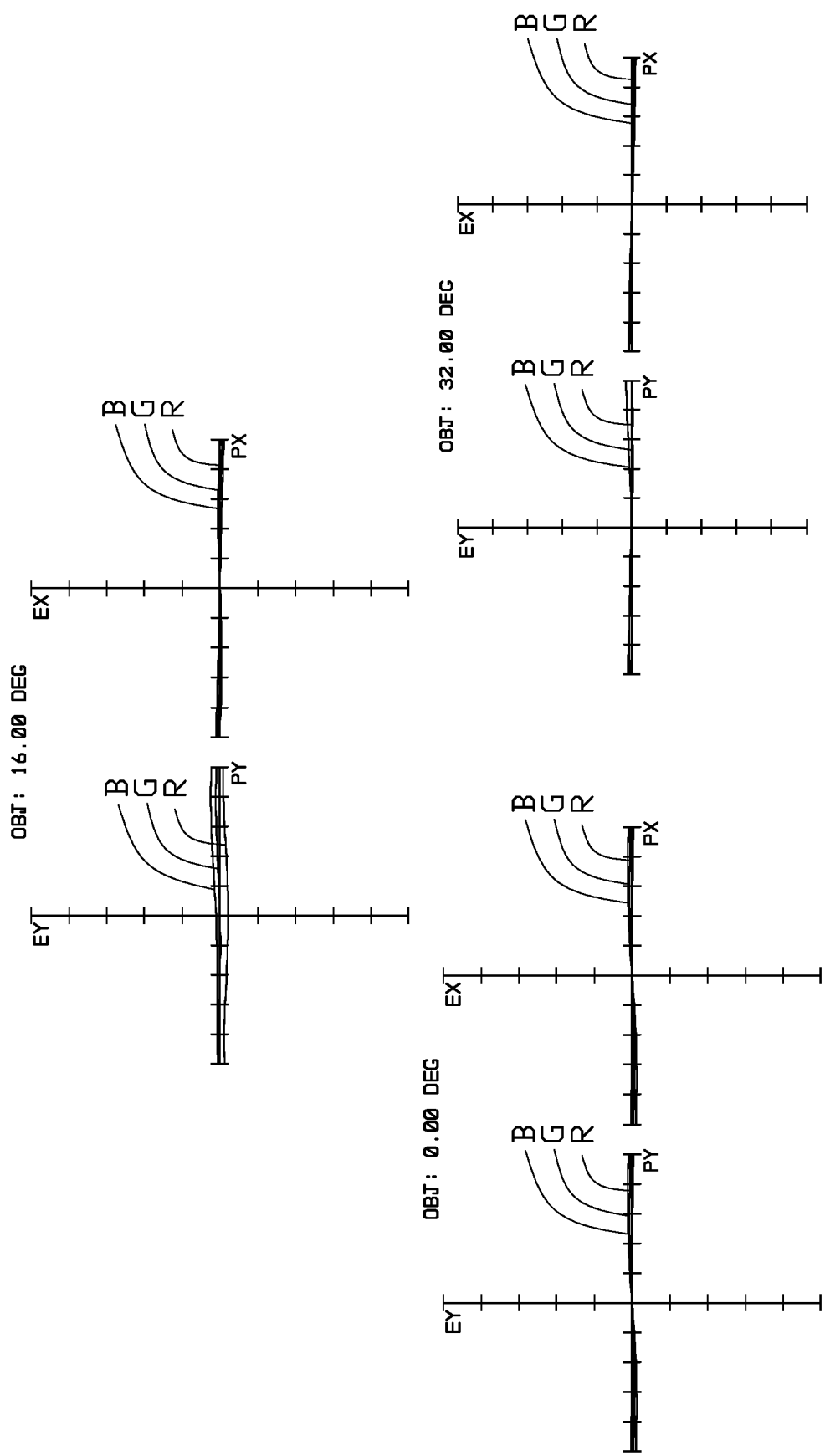
FIG. 12C are coma aberration graphs of the zoom lens of example 2 at a telephoto end.

FIG. 8B is a field curvature graph of the same three colors of light when the zoom lens 100 is at the middle position. FIG. 9B is a distortion graph of the same three colors of light when the zoom lens 100 is at the middle position. FIG. 10B is a lateral chromatic aberration graph of the same three colors of light when the zoom lens 100 is at the middle position. FIG. 11B is a spherical aberration graph of the same three colors of light when the zoom lens 100 is at the middle position. FIG. 12B is a coma aberration graph of the same three colors of light when the zoom lens 100 is at the middle position. Both tangential field curvature and sagittal field curvature of the zoom lens 100 shown in the FIG. 8B are kept within a range of −0.019 mm to 0.030 mm. The distortion of the zoom lens 100 is less than −4.8%. The lateral chromatic aberration of the zoom lens 100 is less than 3.4 μm. The spherical aberration of the zoom lens 100 is kept within a range of −0.003 mm to 0.030 mm. All coma aberrations of the zoom lens 100 at various angles are acceptable.

FIG. 8C is a field curvature graph of the same three colors of light when the zoom lens 100 is at the telephoto end. FIG. 9C is a distortion graph of the same three colors of light when the zoom lens 100 is at the telephoto end. FIG. 10C is a lateral chromatic aberration graph of the same three colors of light when the zoom lens 100 is at the telephoto end. FIG. 11C is a spherical aberration graph of the same three colors of light when the zoom lens 100 is at the telephoto end. FIG.

12C is a coma aberration graph of the same three colors of light when the zoom lens 100 is at the telephoto end. Both tangential field curvature and sagittal field curvature of the zoom lens 100 shown in the FIG. 8C are kept within a range of −0.019 mm to 0.035 mm. The distortion of the zoom lens 100 is less than −4.66%. The lateral chromatic aberration of the zoom lens 100 is less than 3.6 μm. The spherical aberration of the zoom lens 100 is kept within a range of −0.014 mm to 0.035 mm. All coma aberrations of the zoom lens 100 at various angles are acceptable.

As a result, the optical performance (such as field curvature, distortion, lateral chromatic aberration, spherical aberration and coma aberration) of the zoom lens 100 of the example 2 can be controlled/corrected to an acceptable level when the zoom lens 100 is placed at the wide-angle end, the middle position or the telephoto end.

Example 3

Tables 7-9 list the specifications of the zoom lens 100 of the example 3. A structure of the zoom lens 100 of the example 3 is the same as the structure of the zoom lens 100 of the example 1.

TABLE 7

Focal length of the zoom lens 100 (F) = 4.25~12.91 mm; F-number (Fno.) = 2.0~3.9

| Surface | Radius of curvature (mm) | Di(mm) | Refractive index | Abbe number |
|---|---|---|---|---|
| S1 | −5.3774 | 1.0044 | 1.846663 | 23.83 |
| S2 | −5.7158 | 0.1503 | 1.000000 | — |
| S3 | −15.2646 | 0.8239 | 1.635050 | 23.90 |
| S4 | −50.0297 | D4 | 1.000000 | — |
| 60 | Infinity | 0.0160 | 1.000000 | — |
| S5 | 47.2154 | 0.7451 | 1.491756 | 57.44 |
| S6 | −3.3717 | 0.0161 | 1.000000 | — |
| S7 | 4.8739 | 1.0405 | 1.635050 | 23.90 |
| S9 | 2.7593 | 1.2040 | 1.544100 | 23.90 |
| S10 | 10.2757 | D10 | 1.000000 | — |
| S11 | −3.3681 | 0.3516 | 1.491756 | 57.44 |
| S12 | 0.4104 | D12 | 1.000000 | — |
| S13 | Infinity | 0.3000 | 1.516330 | 64.14 |
| S14 | Infinity | 0.0500 | 1.000000 | — |

TABLE 8

| Surface | k | $E_4$ | $E_6$ | $E_8$ | $E_{10}$ |
|---|---|---|---|---|---|
| S3 | 0 | −2.070E−02 | −1.843E−03 | 7.597E−04 | −6.911E−05 |
| S4 | −9.949E+39 | −0.01176 | −5.268E−04 | 6.361E−04 | −7.300E−05 |
| S5 | −9.957E+39 | 0.01348 | −2.305E−03 | 2.240E−04 | −2.632E−06 |
| S6 | 0 | 9.810E−04 | 9.289E−04 | −2.035E−04 | 2.967E−05 |
| S7 | 0 | −4.717E−03 | −6.920E−04 | 4.491E−04 | −4.048E−05 |
| S8 | 0 | 2.311E−02 | −2.085E−02 | 4.646E−03 | −2.164E−04 |
| S10 | 0 | −5.932E−03 | 1.671E−03 | −2.025E−04 | 1.972E−05 |
| S11 | −2.003E+01 | −9.873E−02 | 2.072E−02 | −2.412E−03 | 1.050E−04 |
| S12 | −1.127E+39 | −4.551E−02 | 8.449E−03 | −7.642E−04 | 2.563E−05 |

TABLE 9

| The state of the zoom lens 100 | D4 | D10 | D12 |
|---|---|---|---|
| At the wide-angle end (Fw = 4.24 mm) | 0.4502 | 3.4299 | 0.0200 |
| At the middle position (Fm = 6.27 mm) | 0.4600 | 3.4203 | 0.0431 |
| At the telephoto end (Ft = 12.91 mm) | 0.5456 | 2.5715 | 1.1825 |

TABLE 9-continued

| The state of the zoom lens 100 | D4 | D10 | D12 |
|---|---|---|---|
| At the telephoto end (Ft = 15.18 mm) | 0.5267 | 2.1890 | 1.1849 |

Figure 13A:
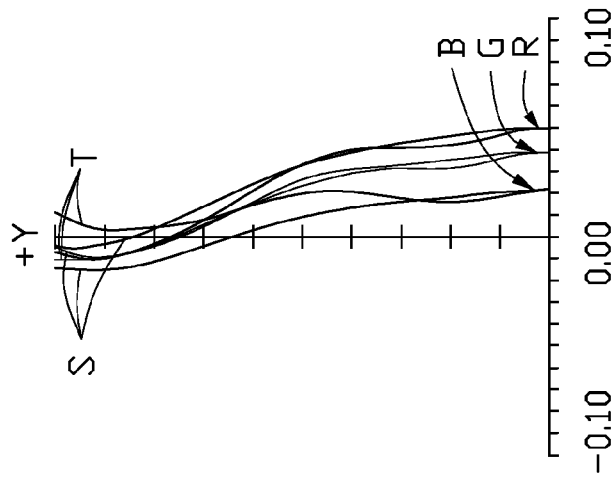
FIG. 13A is a field curvature graph of the zoom lens of example 3 at a wide-angle end.
Figure 14C:
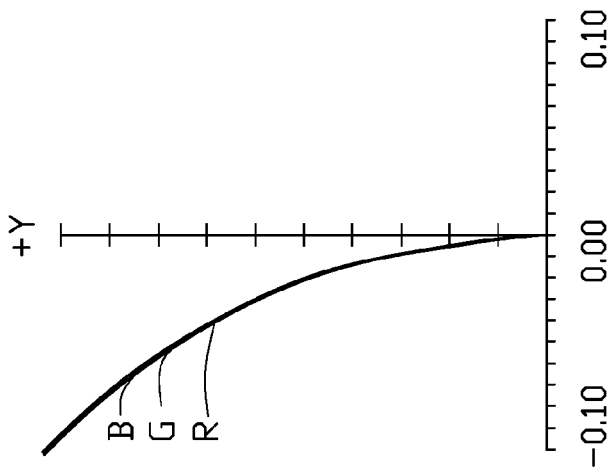
FIG. 14C is a distortion graph of the zoom lens of example 3 at a telephoto end.
Figure 14B:
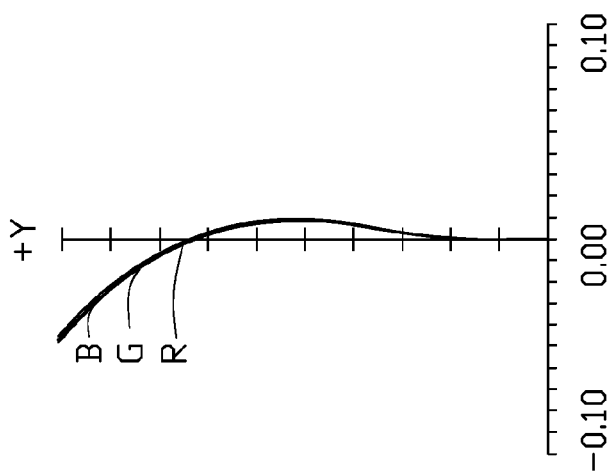
FIG. 14B is a distortion graph of the zoom lens of example 3 at a middle position.
Figure 14A:
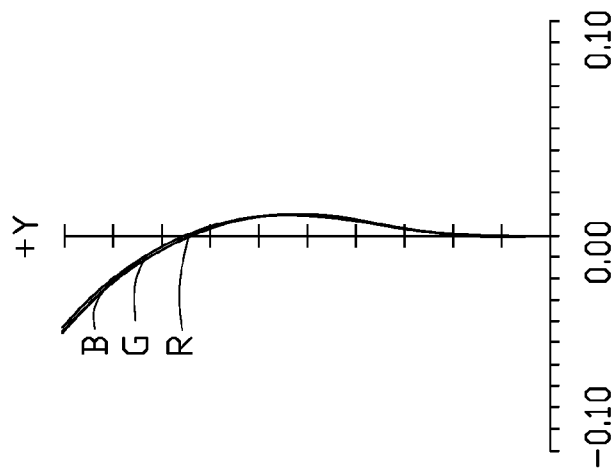
FIG. 14A is a distortion graph of the zoom lens of example 3 at a wide-angle end.
Figure 17A:
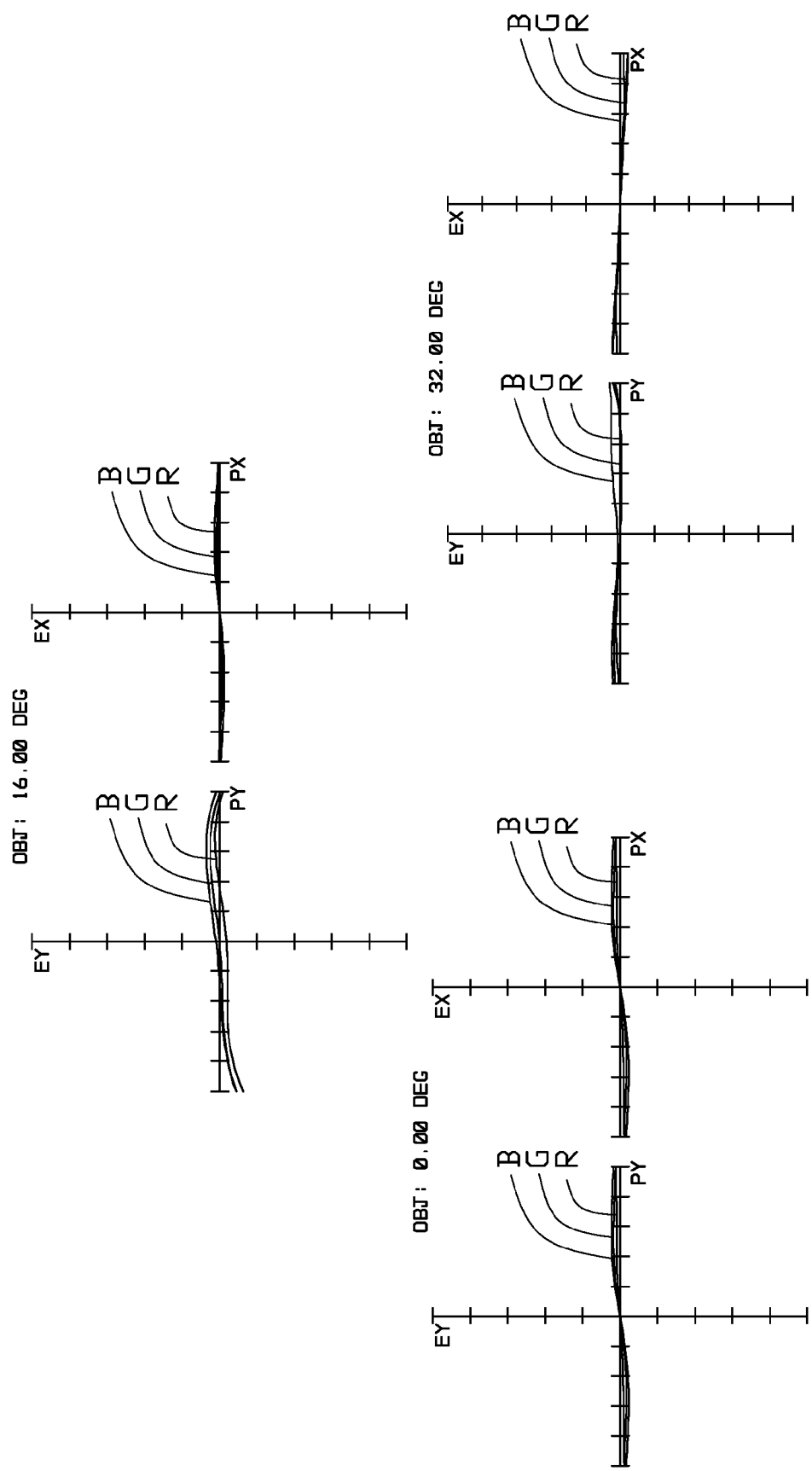
FIG. 17A are coma aberration graphs of the zoom lens of example 3 at a wide-angle end.

FIG. 13A is a field curvature graph of the blue, green, and red light when the zoom lens 100 is at the wide-angle end. FIG. 14A is a distortion graph of the same three colors of light when the zoom lens 100 is at the wide-angle end. FIG. 15A is a lateral chromatic aberration graph of the same three colors of light when the zoom lens 100 is at the wide-angle end. FIG. 16A is a spherical aberration graph of the same three colors of light when the zoom lens 100 is at the wide-angle end. FIG. 17A is a coma aberration graph of the same three colors of light when the zoom lens 100 is at the wide-angle end. Both tangential field curvature and sagittal field curvature of the zoom lens 100 shown in the FIG. 13A are kept within a range of −0.014 mm to 0.050 mm. The distortion of the zoom lens 100 is less than −4.6%. The lateral chromatic aberration of the zoom lens 100 is less than 2.8 The spherical aberration of the zoom lens 100 is kept within a range of 0.008 mm to 0.049 mm. All coma aberrations of the zoom lens 100 at various angles are acceptable.

Figure 13B:
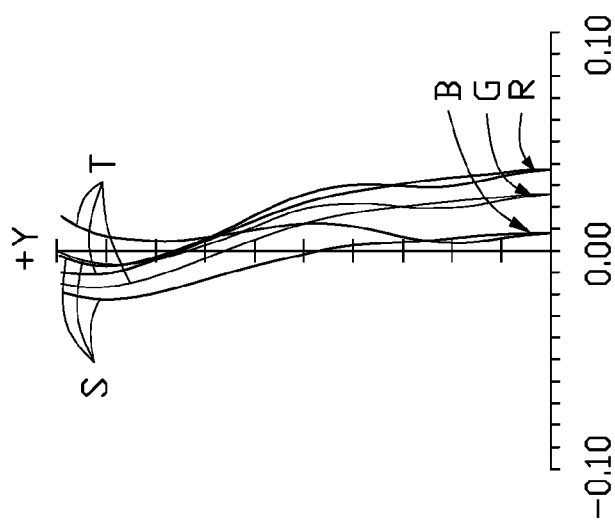
FIG. 13B is a field curvature graph of the zoom lens of example 3 at a middle position.
Figure 17B:
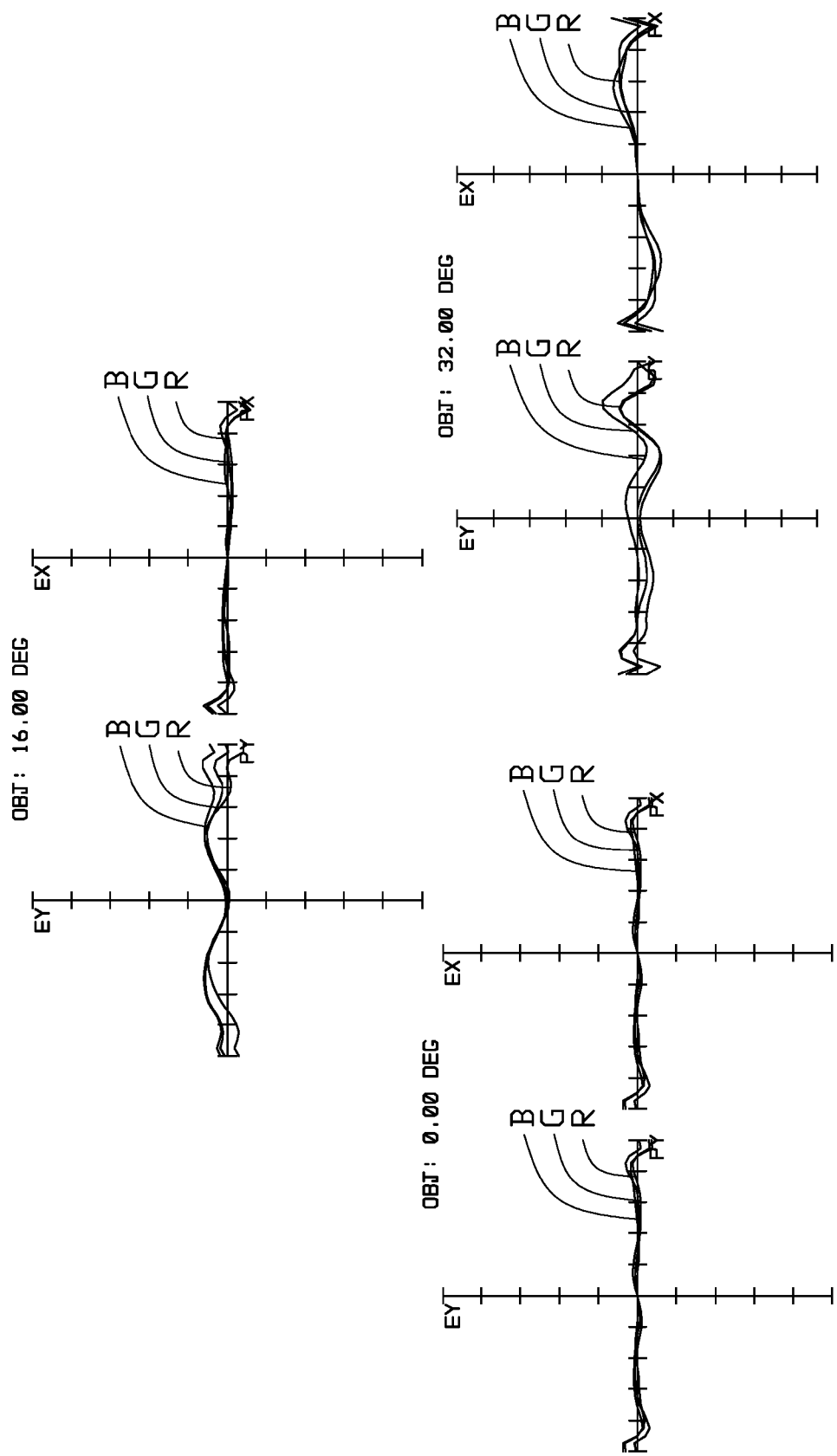
FIG. 17B are coma aberration graphs of the zoom lens of example 3 at a middle position.

FIG. 13B is a field curvature graph of the same three colors of light when the zoom lens 100 is at the middle position. FIG. 14B is a distortion graph of the same three colors of light when the zoom lens 100 is at the middle position. FIG. 15B is a lateral chromatic aberration graph of the same three colors of light when the zoom lens 100 is at the middle position. FIG. 16B is a spherical aberration graph of the same three colors of light when the zoom lens 100 is at the middle position. FIG. 17B is a coma aberration graph of the same three colors of light when the zoom lens 100 is at the middle position. Both tangential field curvature and sagittal field curvature of the zoom lens 100 shown in the FIG. 13B are kept within a range of −0.019 mm to 0.037 mm. The distortion of the zoom lens 100 is less than −4.8%. The lateral chromatic aberration of the zoom lens 100 is less than 2.8 μm. The spherical aberration of the zoom lens 100 is kept within a range of −0.003 mm to 0.037 mm. All coma aberrations of the zoom lens 100 at various angles are acceptable.

Figure 13C:
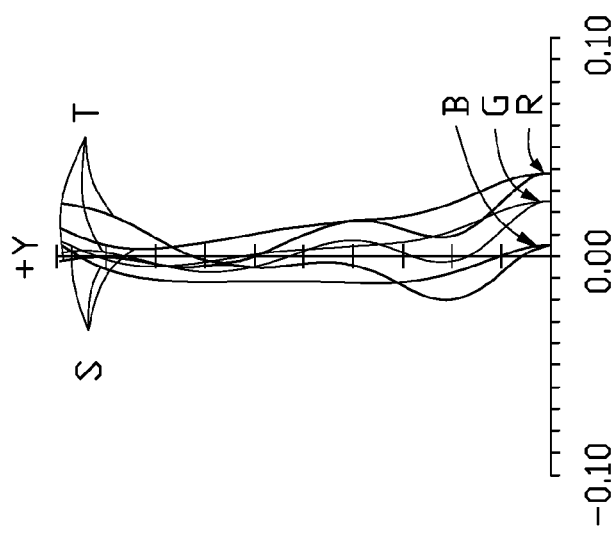
FIG. 13C is a field curvature graph of the zoom lens of example 3 at a telephoto end.
Figure 17C:
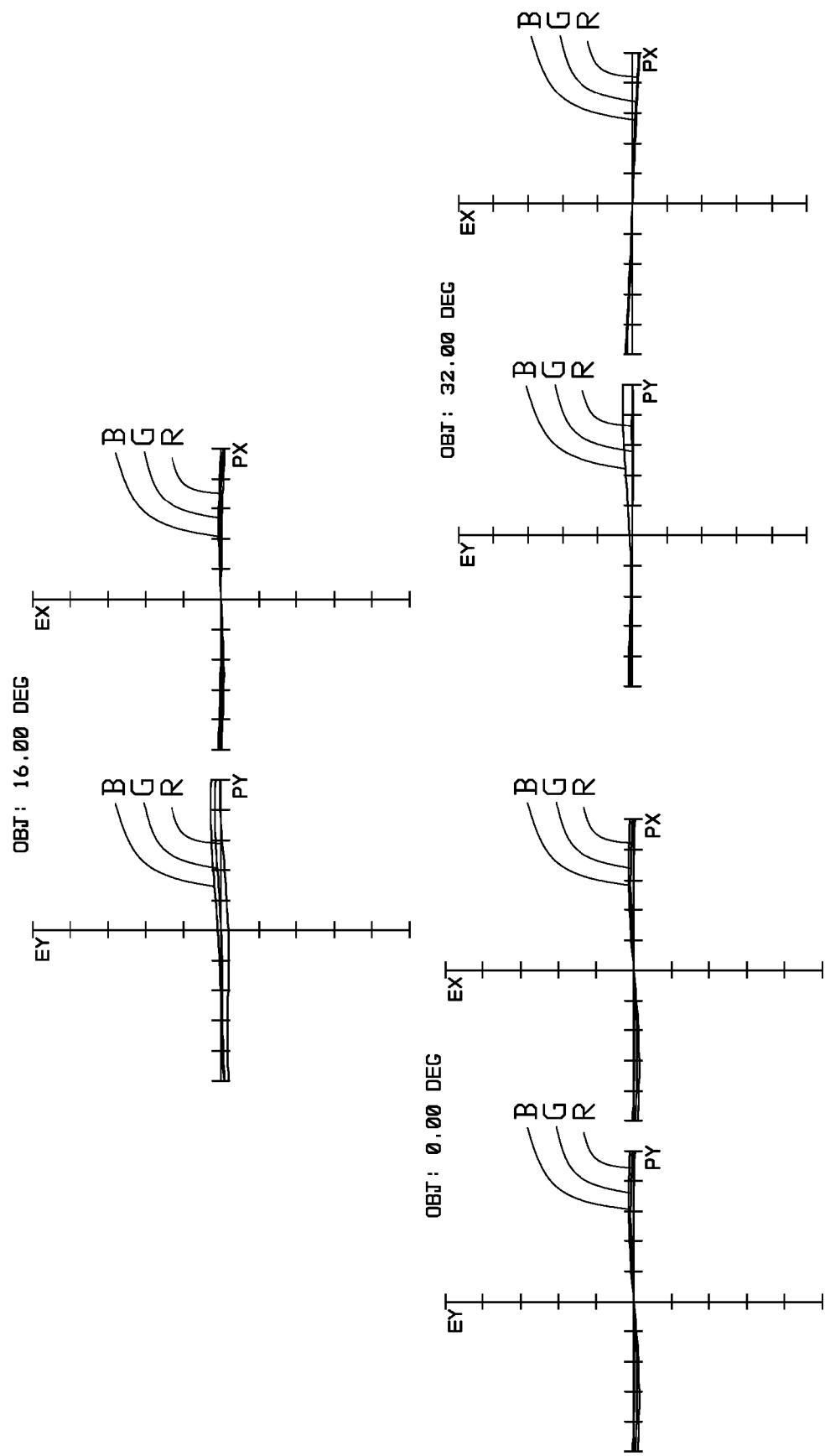
FIG. 17C are coma aberration graphs of the zoom lens of example 3 at a telephoto end.

FIG. 13C is a field curvature graph of the same three colors of light when the zoom lens 100 is at the telephoto end. FIG. 14C is a distortion graph of the same three colors of light when the zoom lens 100 is at the telephoto end. FIG. 15C is a lateral chromatic aberration graph of the same three colors of light when the zoom lens 100 is at the telephoto end. FIG. 16C is a spherical aberration graph of the same three colors of light when the zoom lens 100 is at the telephoto end. FIG. 17C is a coma aberration graph of the same three colors of light when the zoom lens 100 is at the telephoto end. Both tangential field curvature and sagittal field curvature of the zoom lens 100 shown in the FIG. 13C are kept within a range of −0.011 mm to 0.039 mm. The distortion of the zoom lens 100 is less than −10.6%. The lateral chromatic aberration of the zoom lens 100 is less than 3.5 μm. The spherical aberration of the zoom lens 100 is kept within a range of −0.019 mm to 0.038 mm. All coma aberrations of the zoom lens 100 at various angles are acceptable.

As a result, the optical performance (such as field curvature, distortion, lateral chromatic aberration, spherical aberration and coma aberration) of the zoom lens 100 of the example 3 can be controlled/corrected to an acceptable level when the zoom lens 100 is placed at the wide-angle end, the middle position or the telephoto end.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A zoom lens comprising:
   a first lens group having a negative refractive power;
   a second lens group having a positive refractive power;
   a third lens group having a negative refractive power and comprising at least one sixth lens; and
   an image plane;
   wherein the first lens group, the second lens group, the third lens group, and the image plane are arranged in an order from object-side to image-side of the zoom lens;
   the first lens group comprises a first lens having a positive refractive power and a second lens having a negative refractive power, wherein the first lens and the second lens are in the order from object-side to image-side;
   the second lens group comprises a third lens having a positive refractive power, a fourth lens having a negative refractive power, and a fifth lens having a positive refractive power, wherein the third lens, fourth lens, and fifth lens are in the order from object-side to image-side, the fourth lens and the fifth lens are bonded together,
   wherein the zoom lens further comprises a plane lens, the plane lens is between the third lens group and the image plane.

2. The zoom lens of the claim 1, wherein the zoom lens satisfies the formulas:

$TLw/Hy \leq 1.6$;

$0.03 < |F3/Ft| < 0.15$; and $8.9 < |(Fw \times F1)/(Ft \times F3)| < 12.6$;

wherein TLw denotes a distance from a surface of the first lens adjacent to the object-side to the image plane of the zoom lens at the wide-angle end along the optical axis of the zoom lens; Hy denotes an image height of the zoom lens at the telephoto end; F1 denotes an effective focal length of the first lens group; F3 denotes an effective focal length of the third lens group; Fw denotes an effective focal length of the zoom lens at the wide-angle end; Ft denotes an effective focal length of the zoom lens at the telephoto end.

3. The zoom lens of the claim 1, wherein the first lens and the second lens are meniscus lenses and separated from each other; the first lens comprises a first surface facing the object-side and a second surface facing the image-side, the second lens comprises a third surface facing the object-side and a fourth surface facing the image-side; the first surface and the third surface are concave surfaces, the second surface and the fourth surface are convex surfaces; the fourth lens comprises a seventh surface facing the object-side and an eighth surface facing the image-side, the fifth lens comprises a ninth surface facing the object-side and a tenth surface facing the image-side; the seventh surface and the ninth surface are convex surfaces, the eighth surface and the tenth surface are concave surfaces.

4. The zoom lens of the claim 3, wherein the zoom lens further satisfies the formulas:

$1.06 < |R12/R11| < 1.15$; and $0.12 < |(TLw-TLt)/Fw| < 0.13$;

wherein R11 denotes a radius of curvature of the first surface; R12 denotes a radius of curvature of the second surface; TLt denotes a distance from the first surface to the image plane of the zoom lens at the telephoto end along the optical axis of the zoom lens.

5. The zoom lens of the claim 3, wherein at least one of the first surface, the second surface, the third surface and the fourth surface is an aspherical surface, at least one of the seventh surface, the eighth surface, the ninth surface and the tenth surface is an aspherical surface.

6. The zoom lens of the claim 1, wherein the zoom lens further satisfies the formulas:

$n1 < 30$ and $|n1-n2| < 0.13$; and $0.28 < |f4/V4+f5/V5| < 0.42$;

wherein n1 denotes a refractive index of the first lens; n2 denotes a refractive index of the second lens; f4 denotes an effective focal length of the fourth lens; f5 denotes an effective focal length of the fifth lens; V4 denotes an Abbe number of the fourth lens; V5 denotes an Abbe number of the fifth lens.

7. The zoom lens of the claim 1, wherein the zoom lens further comprises an aperture stop between the first lens group and the second lens group, the aperture stop is adjacent to the second lens group, the aperture stop move along an optical axis of the zoom lens with the second lens group.

8. The zoom lens of the claim 1, wherein at least one of the first lens and the second lens is made of plastic, at least one of the third lens, the fourth lens, and the fifth lens is made of plastic, the sixth lens is made of plastic.

9. An image device comprising:
   a zoom lens comprising:
      a first lens group having a negative refractive power;
      a second lens group having a positive refractive power;
      a third lens group having a negative refractive power and comprising at least one sixth lens; and
      an image plane;
      wherein the first lens group, the second lens group, the third lens group, and the image plane are arranged in an order from object-side to image-side of the zoom lens;
      the first lens group comprises a first lens having a positive refractive power and a second lens having a negative refractive power, wherein the first lens and the second lens are in the order from object-side to image-side;

the second lens group comprises a third lens having a positive refractive power, a fourth lens having a negative refractive power, and a fifth lens having a positive refractive power, wherein the third lens, fourth lens, and fifth lens are in the order from object-side to image-side, the fourth lens and the fifth lens are bonded together, wherein the zoom lens further comprises a plane lens, the plane lens is between the third lens group and the image plane.

10. The image device of the claim 9, wherein the zoom lens satisfies the formulas:

$TLw/Hy \leq 1.6;$ $0.03 < |F3/Ft| < 0.15;$ and $8.9 < |(Fw \times F1)/(Ft \times F3)| < 12.6;$ wherein TLw denotes a distance from a surface of the first lens adjacent to the object-side to the image plane of the zoom lens at the wide-angle end along the optical axis of the zoom lens; Hy denotes an image height of the zoom lens at the telephoto end; F1 denotes an effective focal length of the first lens group; F3 denotes an effective focal length of the third lens group; Fw denotes an effective focal length of the zoom lens at the wide-angle end; Ft denotes an effective focal length of the zoom lens at the telephoto end.

11. The image device of the claim 9, wherein the first lens and the second lens are meniscus lenses and separated from each other; the first lens comprises a first surface facing the object-side and a second surface facing the image-side, the second lens comprises a third surface facing the object-side and a fourth surface facing the image-side; the first surface and the third surface are concave surfaces, the second surface and the fourth surface are convex surfaces; the fourth lens comprises a seventh surface facing the object-side and an eighth surface facing the image-side, the fifth lens comprises a ninth surface facing the object-side and a tenth surface facing the image-side; the seventh surface and the ninth surface are convex surfaces, the eighth surface and the tenth surface are concave surfaces.

12. The image device of the claim 11, wherein the zoom lens further satisfies the formulas:

$1.06 < |R12/R11| < 1.15;$ and $0.12 < |(TLw - TLt)/Fw| < 0.13;$ wherein R11 denotes a radius of curvature of the first surface; R12 denotes a radius of curvature of the second surface; TLt denotes a distance from the first surface to the image plane of the zoom lens at the telephoto end along the optical axis of the zoom lens.

13. The image device of the claim 11, wherein at least one of the first surface, the second surface, the third surface and the fourth surface is an aspherical surface, at least one of the seventh surface, the eighth surface, the ninth surface and the tenth surface is an aspherical surface.

14. The image device of the claim 9, wherein the zoom lens further satisfies the formulas:

$n1 < 30$ and $|n1 - n2| < 0.13;$ and $0.28 < |f4/V4 + f5/V5| < 0.42;$ wherein n1 denotes a refractive index of the first lens; n2 denotes a refractive index of the second lens; f4 denotes an effective focal length of the fourth lens; f5 denotes an effective focal length of the fifth lens; V4 denotes an Abbe number of the fourth lens; V5 denotes an Abbe number of the fifth lens.

15. The image device of the claim 9, wherein the zoom lens further comprises an aperture stop between the first lens group and the second lens group, the aperture stop is adjacent to the second lens group, the aperture stop move along an optical axis of the zoom lens with the second lens group.

16. The image device of the claim 9, wherein at least one of the first lens and the second lens is made of plastic, at least one of the third lens, the fourth lens and the fifth lens is made of plastic, the sixth lens is made of plastic.

* * * * *